US00RE42166E

(19) United States
(12) Reissued Patent
Oya

(10) Patent Number: US RE42,166 E
(45) Date of Reissued Patent: Feb. 22, 2011

(54) MONITORING APPARATUS, MANAGEMENT METHOD AND PROGRAM THEREFOR, AND MANAGEMENT APPARATUS AND MANAGEMENT METHOD AND PROGRAM THEREFOR

(75) Inventor: Takeshi Oya, Kawasaki (JP)

(73) Assignee: Canon Kabushiki Kaisha, Tokyo (JP)

(21) Appl. No.: 11/869,920

(22) Filed: Oct. 10, 2007

Related U.S. Patent Documents

Reissue of:
(64) Patent No.: 6,954,720
Issued: Oct. 11, 2005
Appl. No.: 10/748,215
Filed: Dec. 31, 2003

(30) Foreign Application Priority Data

Jan. 10, 2003 (JP) ..... 2003-005156

(51) Int. Cl.
*G06F 11/00* (2006.01)
*G06F 15/173* (2006.01)

(52) U.S. Cl. ..... 702/188; 702/182; 702/184; 709/218; 709/224

(58) Field of Classification Search ..... 702/188, 702/187, 182, 183, 184, 186; 709/217–220, 709/223, 224
See application file for complete search history.

(56) References Cited

U.S. PATENT DOCUMENTS 6,771,385 B1 8/2004 Iizuka et al.
2003/0009541 A1 * 1/2003 Sato ..... 709/220
2003/0188230 A1 10/2003 Ezure ..... 714/47
2003/0204583 A1 10/2003 Kaneda et al. ..... 709/223
2004/0128376 A1 7/2004 Matsune et al. ..... 709/223

FOREIGN PATENT DOCUMENTS

JP 4-56560 2/1992
JP 2000267201 A 9/2000
JP 2001043187 A 2/2001
JP 2001142938 A 5/2001

* cited by examiner

*Primary Examiner*—Bryan Bui
(74) *Attorney, Agent, or Firm*—Fitzpatrick, Cella, Harper & Scinto

(57) ABSTRACT

There is provided a monitoring apparatus that can reduce the processing load when a plurality of such monitoring apparatuses are centrally managed. The monitoring apparatus is capable of communicating with a management apparatus that centrally manages a plurality of monitoring apparatuses. The monitoring apparatus manages maintenance information relating to a plurality of peripheral apparatuses, including at least operation information. The maintenance information relating to the peripheral apparatuses is managed. Confirmation information including identification information identifying the monitoring apparatus, and the managed maintenance information is periodically transmitted. The management apparatus generates monitoring object management information based on a history of transmissions of the transmitted confirmation information.

31 Claims, 25 Drawing Sheets

*FIG. 12*

901 Date:Mon,08 Apr 2002 16:41:19+0900
902 From:<agent001_211@shop1.ccsalse.co.jp>
903 To:<Sever@abcd.co.jp>
904 Subject:Beacon from agent001_211
905 Message-Id:<20020408163943.854D.agent001_211@shop1.ccsale.co.jp>
906 MIME-Version:1.0
907 Content-Type:text/plain;charset="ISO-2022-JP"
908 Content-Transfer-Encording:7bit
909 Return-Path:agent001_211@shop1.ccsale.co.jp

*FIG. 13*

1001 Date:Mon,08 Apr 2002 12:30:12+0900
1002 From:<Server01@abcd.co.jp>
1003 To:<service_shop211@abcd.co.jp>
1004 Subject:No active Agent List
1005 Message-Id:<20020408165343.854D.Server01@abcd.co.jp>
1006 MIME-Version:1.0
1007 Content-Type:text/plain;charset="ISO-2022-JP"
1008 Content-Transfer-Encording:7bit
1009 Return-Path:Service_shop211@abcd.co.jp 1010 The list is unreported agent list more than 3 days

*FIG. 18*

| | |
|---|---|
| TIME OF NEXT TRANSMISSION | MAY 10 |
| NUMBER OF TRANSMISSIONS | 8 TIMES |
| LAST TIME TRANSMITTED | MAY 8 |

*FIG. 19*

| TRANSMISSION TIME CONDITIONS | TRANSMISSION TIMING | E-MAIL CONTENTS | SETTING OF NUMBER OF TRANSMISSIONS |
|---|---|---|---|
| TRANSMISSION TIME EXCEEDED | 1 DAY AFTER | 1 day after | NUMBER OF TRANSMISSIONS = 1 |
| NUMBER OF TRANSMISSIONS LESS THAN 5 | 1 DAY AFTER | 1 day after | NUMBER OF TRANSMISSIONS + 1 |
| NUMBER OF TRANSMISSIONS LESS THAN 10 | 2 DAYS AFTER | 2 days after | NUMBER OF TRANSMISSIONS + 1 |
| NUMBER OF TRANSMISSIONS LESS THAN 20 | 3 DAYS AFTER | 3 days after | NUMBER OF TRANSMISSIONS + 1 |
| NUMBER OF TRANSMISSIONS 20 OR MORE | 5 DAYS AFTER | 5 days after | NUMBER OF TRANSMISSIONS + 1 |

*FIG.20*

| SENDER ID | DATE OF NEXT SCHEDULED RECEPTION | DATE OF LAST RECEPTION |
|---|---|---|
| agent001_211 | 2002/05/10 | 2002/05/8 |
| agent122_045 | 2002/05/11 | 2002/05/10 |
| agent_OP_P1 | 2002/05/13 | 2002/05/8 |
| agent_FA_001 | 2002/05/13 | 2002/05/10 |

*FIG. 25*

| CONDITION |
| --- |
| NUMBER OF RECEPTIONS IS LESS THAN 10 AND 32 DAYS HAVE PASSED SINCE DATE OF LAST RECEPTION |
| NUMBER OF RECEPTIONS IS 10 OR MORE BUT LESS THAN 20 AND "(DATE OF LAST RECEPTION - DATE OF FIRST RECEPTION) X 2 / NUMBER OF RECEPTIONS + DATE OF LAST RECEPTION" IS PRIOR TO CURRENT DATE |
| NUMBER OF RECEPTIONS IS 20 OR MORE AND "(DATE OF LAST RECEPTION - DATE OF FIRST RECEPTION)/NUMBER OF RECEPTIONS + DATE OF LAST RECEPTION" IS PRIOR TO CURRENT DATE |

*FIG.26*

| SENDER ID | NUMBER OF RECEPTIONS | DATE OF FIRST RECEPTION | DATE OF LAST RECEPTION |
|---|---|---|---|
| agent001_211 | 44 | 2001/10/21 | 2002/05/12 |
| agent122_045 | 26 | 2002/01/04 | 2002/05/16 |
| agent_OP_P1 | 25 | 2002/01/04 | 2002/05/12 |
| agent_FA_001 | 10 | 2002/03/10 | 2002/04/09 |

MONITORING APPARATUS, MANAGEMENT METHOD AND PROGRAM THEREFOR, AND MANAGEMENT APPARATUS AND MANAGEMENT METHOD AND PROGRAM THEREFOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a monitoring apparatus, a management method and program therefor, a management apparatus, and a management method and program therefor, and more particularly, to a plurality of monitoring apparatuses that monitor a plurality of peripheral apparatuses, a management apparatus that centrally manages the monitoring apparatuses, a management method and management program executed by each of the monitoring apparatuses, and a management method and management program executed by the management apparatus.

2. Description of the Related Art

Conventionally, as a method of remotely monitoring a variety of computer apparatuses including office equipment such as image forming apparatuses, a technique is known in which a monitoring apparatus is installed in a network to which computer apparatuses are connected, the computer apparatuses are monitored by the monitoring apparatus via the network, and information on monitoring results is transferred from the monitoring apparatus to a management server.

Further, a technique is known in which a request for response is made to a terminal apparatus being utilized on the user's side from a management server, and the management server, upon receiving the response from the terminal apparatus, confirms that the terminal apparatus itself or a transmission function to a telephone line at the terminal apparatus is functioning properly (for example, refer to Japanese Laid-Open Patent Publication (Kokai) No. 04-056560).

However, in the conventional art described in Japanese Laid-Open Patent Publication (Kokai) No. 04-056560, the management server requires two data transfers, i.e., the transmission of the request for response and the reception of that response. Moreover, if a plurality of monitoring apparatuses exist, the management server must perform these two data transfers for every such monitoring apparatus.

Further, when the management server transmits a response request to a plurality of monitoring apparatuses, whether it does so all at a time or at respective different times, in either case, the management server must check for a response at every monitoring apparatus.

Accordingly, the conventional art imposes a very heavy processing load upon the management server when monitoring a plurality of monitoring apparatuses.

SUMMARY OF THE INVENTION

It is an object of the present invention to provide a monitoring apparatus, a management method and program therefor, a management apparatus, and a management method and program therefor, that can reduce the processing load when a plurality of monitoring apparatuses are centrally managed.

To attain the above object, in a first aspect of the present invention, there is provided a monitoring apparatus capable of communicating with a management apparatus that centrally manages a plurality of monitoring apparatuses, the monitoring apparatus managing maintenance information relating to a plurality of peripheral apparatuses, including at least operation information, comprising a management device that manages the maintenance information relating to the peripheral apparatuses, and a communication control device that periodically transmits confirmation information including identification information identifying the monitoring apparatus, and the maintenance information managed by the management apparatus, the management apparatus generates monitoring object management information based on a history of transmissions of the confirmation information carried out by the communication control device.

Preferably, the monitoring apparatus further comprises a generation device that generates the confirmation information such that an identifier capable of identifying the confirmation information is contained in the confirmation information, and the communication control device periodically transmits the confirmation information with the identifier contained therein to the management apparatus.

More preferably, the generation device generates an e-mail that contains the identification information identifying the monitoring apparatus therein and the identifier in a subject thereof.

To attain the above object, in a second aspect of the present invention, there is provided a management apparatus capable of communicating with a plurality of monitoring apparatuses that manage maintenance information relating to a plurality of peripheral apparatuses, including at least operation information, for centrally managing the plurality of monitoring apparatuses, comprising a generation device that generates monitoring object management information based on a history of transmissions of confirmation information including identification information identifying each of the monitoring apparatuses, and the maintenance information managed thereby, the transmissions being periodically carried out by each of the monitoring apparatuses.

Preferably, the monitoring object management information comprises information indicative of a list capable of identifying at least one monitoring apparatus for which the history of transmissions meets predetermined conditions.

Preferably, the management apparatus further comprises a determination device that determines whether information capable of identifying at least one monitoring apparatus is to be included in the monitoring object management information, and the generation device adds the information capable of identifying the at least one monitoring apparatus to the information indicative of the list when the determination device determines that the information capable of identifying the at least one monitoring apparatus is to be included in the monitoring object management information.

Preferably, the management apparatus further comprises a communication control device that transmits the monitoring object management information to the plurality of monitoring apparatuses.

Preferably, the management apparatus further comprises a recording device that records a time of next transmission of the confirmation information that is periodically transmitted by each of the plurality of monitoring apparatuses, and an abnormality determination device that, if the confirmation information has not arrived at the time of next transmission from any of the plurality of monitoring apparatuses, determines that an abnormality exists in the monitoring apparatus.

Preferably, the management apparatus further comprises a registration device that registers the identification information identifying each of the monitoring apparatuses, and the registration device registers identification information included in the confirmation information transmitted from any of the monitoring apparatuses, if the registration information has not yet been registered.

Preferably, the management apparatus further comprises a registration device that registers the identification information identifying each of the monitoring apparatuses, and the registration device deletes from the registered identification information identification information identifying any of the monitoring apparatuses for which the history of transmissions meets predetermined conditions.

To attain the above object, in a third aspect of the present invention, there is provided a management method executed by a monitoring apparatus capable of communicating with a management apparatus that centrally manages a plurality of monitoring apparatuses, the monitoring apparatus managing maintenance information relating to a plurality of peripheral apparatuses, including at least operation information, comprising a management step of managing the maintenance information relating to the peripheral apparatuses, and a communication control step of periodically transmitting confirmation information including identification information identifying the monitoring apparatus, and the maintenance information managed by the management apparatus, the management apparatus generates monitoring object management information based on a history of transmissions of the confirmation information carried out in the communication control step.

Preferably, the management method further comprises a generation step of creating the confirmation information such that an identifier capable of identifying the confirmation information is contained in the confirmation information, and the communication control step comprises periodically transmitting the confirmation information with the identifier contained therein to the management apparatus.

More preferably, the generation step comprises creating an e-mail that contains the identification information identifying the monitoring apparatus therein and the identifier in a subject thereof.

To attain the above object, in a forth aspect of the present invention, there is provided a management method executed by a management apparatus capable of communicating with a plurality of monitoring apparatuses that manage maintenance information relating to a plurality of peripheral apparatuses, including at least operation information, for centrally managing the plurality of monitoring apparatuses, comprising a generation step of creating monitoring object management information based on a history of transmissions of confirmation information including identification information identifying each of the monitoring apparatuses, and the maintenance information managed thereby, the transmissions being periodically carried out by each of the monitoring apparatuses.

Preferably, the monitoring object management information comprises information indicative of a list capable of identifying at least one monitoring apparatus for which the history of transmissions meets predetermined conditions.

Preferably, the management method further comprises a determination step of determining whether information capable of identifying at least one monitoring apparatus is to be included in the monitoring object management information, and the generation step comprises adding the information capable of identifying the at least one monitoring apparatus to the information indicative of the list when it is determined in the determination step that the information capable of identifying the at least one monitoring apparatus is to be included in the monitoring object management information.

Preferably, the management method further comprises a communication control step of transmitting the monitoring object management information to the plurality of monitoring apparatuses.

Preferably, the management method further comprises a recording step of recording a time of next transmission of the confirmation information that is periodically transmitted by each of the plurality of monitoring apparatuses, and an abnormality determination step of determining, if the confirmation information has not arrived at the time of next transmission from any of the plurality of monitoring apparatuses, that an abnormality exists in the monitoring apparatus.

Preferably, the management method further comprises a registration step of registering the identification information identifying each of the monitoring apparatuses, and the registration step comprises registering identification information included in the confirmation information transmitted from any of the monitoring apparatuses, if it has not yet been registered.

Preferably, the management method further comprises a registration step of registering the identification information identifying each of the monitoring apparatuses, and the registration step comprises deleting from the registered identification information identification information identifying any of the monitoring apparatuses for which the history of transmissions meets predetermined conditions.

To attain the above object, in a fifth aspect of the present invention, there is provided a computer-executable management program for a monitoring apparatus capable of communicating with a management apparatus that centrally manages a plurality of monitoring apparatuses, the monitoring apparatus managing maintenance information relating to a plurality of peripheral apparatuses, including at least operation information, comprising a management module for managing the maintenance information relating to the peripheral apparatuses, and a communication control module for periodically transmitting confirmation information including identification information identifying the monitoring apparatus, and the maintenance information managed by the management apparatus, the management apparatus generates monitoring object management information based on a history of transmissions of the confirmation information carried out by the communication control module.

To attain the above object, in a sixth aspect of the present invention, there is provided a computer-executable management program for a management apparatus capable of communicating with a plurality of monitoring apparatuses that manage maintenance information relating to a plurality of peripheral apparatuses, including at least operation information, for centrally managing the plurality of monitoring apparatuses, comprising a generation module for creating monitoring object management information based on a history of transmissions of confirmation information including identification information identifying each of the monitoring apparatuses, and the maintenance information managed thereby, the transmissions being periodically carried out by each of the monitoring apparatuses.

The above and other objects, features and advantages of the invention will become more apparent from the following detailed description taken in conjunction with the accompanying drawings.

BRIEF DESCRIPTION OF THE DRAWINGS

FIG. 12 is a diagram showing an example of the contents of an e-mail transmitted to the center side management server from the monitoring apparatus;

FIG. 13 is a diagram showing an example of the contents of an e-mail transmitted to a preset sender from the center side management server;

FIG. 18 is a diagram showing an example of periodic process recording information (e-mail generation history information) in FIG. 17;

FIG. 19 is a diagram showing an example of timing regulation information in FIG. 17;

FIG. 20 is a diagram showing an example of DB information held by a database in the center side management server in FIG. 17;

FIG. 25 is a diagram showing an example of processing setting information according to the third embodiment;

FIG. 26 is a diagram showing an example of information stored in a database;

DETAILED DESCRIPTION OF THE PREFERRED EMBODIMENTS

The present invention will now be described in detail with reference to the drawings showing preferred embodiments thereof.

Figure 1:
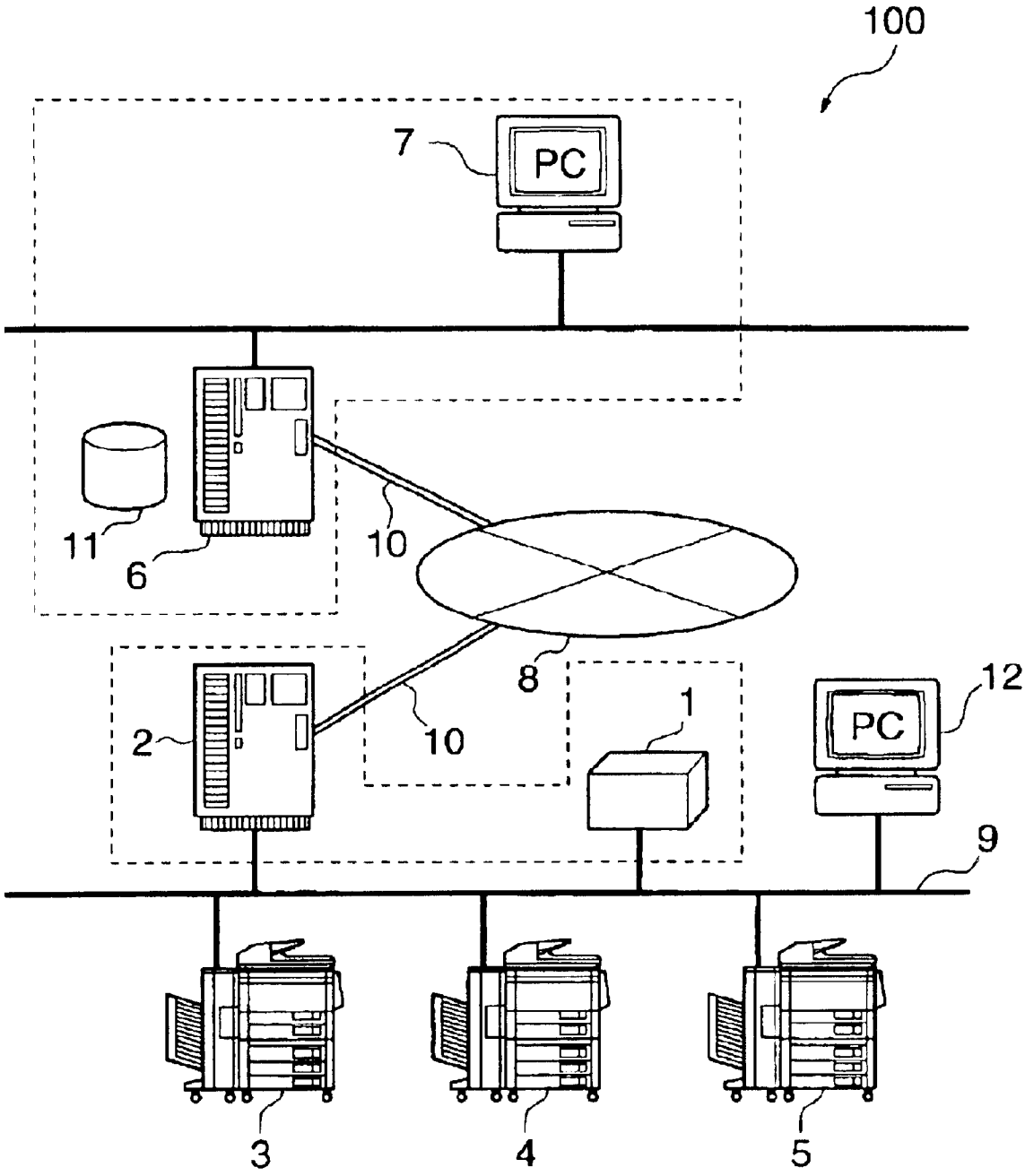
FIG. 1 is a diagram showing the overall construction of a remote monitoring system including a monitoring apparatus and a management apparatus according to a first embodiment of the present invention.

FIG. 1 is a diagram showing the overall construction of a remote monitoring system including a monitoring apparatus and a management apparatus according to a first embodiment of the present invention.

In FIG. 1, in a remote monitoring system 100, a center side management server 6 (management apparatus) and a terminal side management server 2 are implemented by ordinary information processing apparatuses. In the present system 100, a POP server, not shown, receives an e-mail and transfers that e-mail to an e-mail address and exists as a server other than the terminal side management server 2 and the center side management server 6.

The center side management server 6 and the terminal side management server 2 are connected to each other by a predetermined protocol 10 via a communications line 8. However, in order to prevent unauthorized access, or to surmount firewalls, a typical protocol (SMTP) and verification are also provided.

A monitoring apparatus 1 is connected via a network 9 to image forming apparatuses 3–5 and a personal computer (hereinafter referred to as "PC") 12 as peripheral apparatuses. The monitoring apparatus 1 has a function for collecting operation information and failure information (described in detail later) on the image forming apparatuses 3–5 and the PC 12, and a function for updating control programs and the like executed by the image forming apparatuses 3–5 and the PC 12 as well as a function for transferring the collected information to the center side management server 6 via the terminal side management server 2.

A PC 7 is connected to the center side management server 6 via a network and operates as a client computer of the center side management server 6. The PC 7 executes a variety of information processes and also shares information collected by the center side management server 6.

Although the monitoring apparatus 1 and the terminal side management server 2 are provided as separate units as shown in FIG. 1, the monitoring apparatus 1 and the terminal side management server 2 may be provided as a single unit. Moreover, although the PC7 and the center side management server 6 are provided as separate units, the PC7 and the center side management server 6 may be provided as a single unit. These alternative configurations are shown by the areas demarcated by the dotted lines in FIG. 1.

Moreover, although FIG. 1 shows only a single monitoring apparatus 1, in actuality a plurality of monitoring apparatuses are connected to the network 9 as are image forming apparatuses and PCs, which are monitored by the respective monitoring apparatuses, with the center side management server 6 managing in a centralized manner these plurality of monitoring apparatuses. Each of the plurality of monitoring apparatuses implements a variety of processes and controls, described later.

Specifically, the image forming apparatuses 3–5 may be printers (including photoelectric and inkjet types), facsimile machines, scanners, digital copiers integrating both printer and facsimile functions or printer servers.

The PC 12, for example, is provided with a function for converting predetermined application data to PDL (Page Description Language) data via an OS (Operating System) and a printer driver and a function for transmitting that PDL data to any of the image forming apparatuses 3–5.

It should be noted that the monitoring apparatus 1 collects maintenance information from the image forming apparatuses 3–5 and the PC 12. The maintenance information includes at least failure information contained in operation information. At the image forming apparatuses 3–5, the operation information may include the state of the apparatuses, the amount of remaining toner, the number of pages printed per sheet size, and so on. At the PC 12, the operation information may include the operating status of a CPU and memory in the PC 12 and the usage status of any fee-based applications. The failure information may include jam information at the image forming apparatuses 3–5 and the number of times the PC 12 has been restarted. The foregoing definition of maintenance information is also applicable to second and third embodiments of the present invention, described later.

Figure 2:
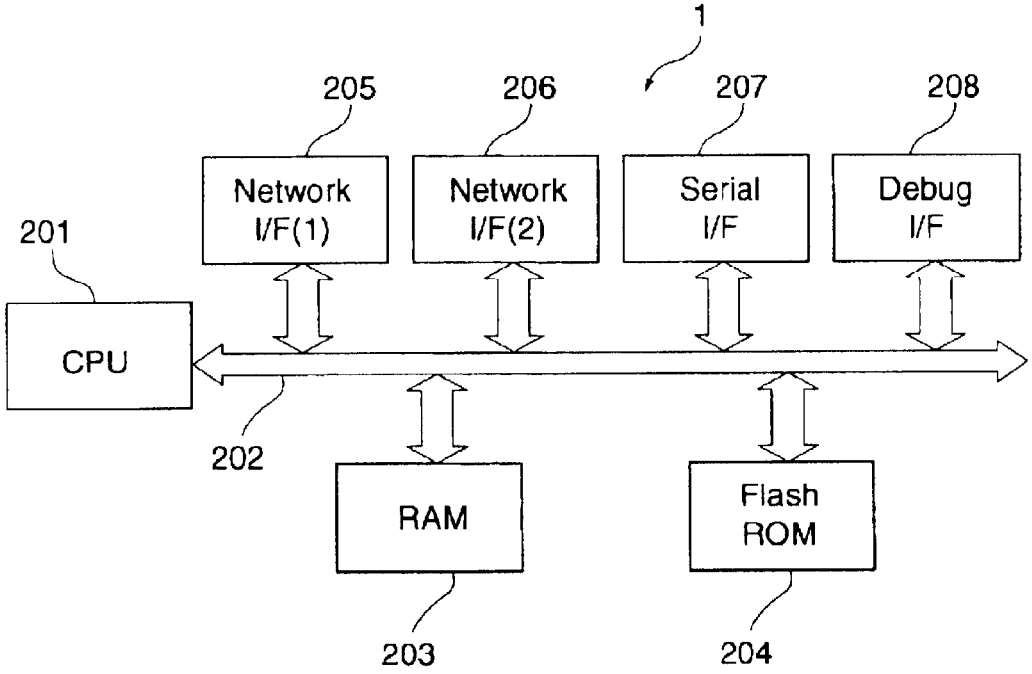
FIG. 2 is a block diagram showing the hardware arrangement of the monitoring apparatus in FIG. 1.

FIG. 2 is a block diagram showing the hardware arrangement of the monitoring apparatus 1 in FIG. 1. The monitoring apparatus 1 is provided with interfaces for a plurality of different applications, in addition to a configuration as provided in an ordinary information processing apparatus.

In FIG. 2, a CPU 201 controls the component parts in the monitoring apparatus 1, individually and/or collectively. A bus 202 receives and transmits data between the component parts in the monitoring apparatus 1. A RAM 203 can electrically store information and is rewritable. A Flash ROM 204 is a nonvolatile memory that can continue to store information even after the power is turned off and is electrically rewritable. Network interfaces (hereinafter network I/F) 205, 206 exchange information with external apparatuses via the network 9. A serial interface (hereinafter serial I/F) 207 exchanges information via RS232C serial communications. A debug interface (hereinafter debug I/F) 208 is a serial communication unit used for debugging applications.

It should be noted that although the monitoring apparatus 1 may be provided with an input device such as a keyboard, a display unit, a display controller and the like, by connecting to the network I/F 205, 206 a serviceman PC, for example, and activating a setting program in the monitoring apparatus 1 using that PC, the settings of the monitoring apparatus 1 can be changed, thus eliminating the need to provide an input device, display unit and display controller and thereby making a low-cost configuration of the apparatus possible.

Moreover, the terminal side management server 2, PC 12, center side management server 6 and PC 7 may each have a configuration that is provided in an ordinary information processing apparatus, and detailed description thereof is thus omitted.

Next, a description will be given of failure monitoring of the image forming apparatuses 3–5 and the PC 12 performed by the monitoring apparatus 1, with reference to FIG. 3 and FIG. 4.

Figure 3:
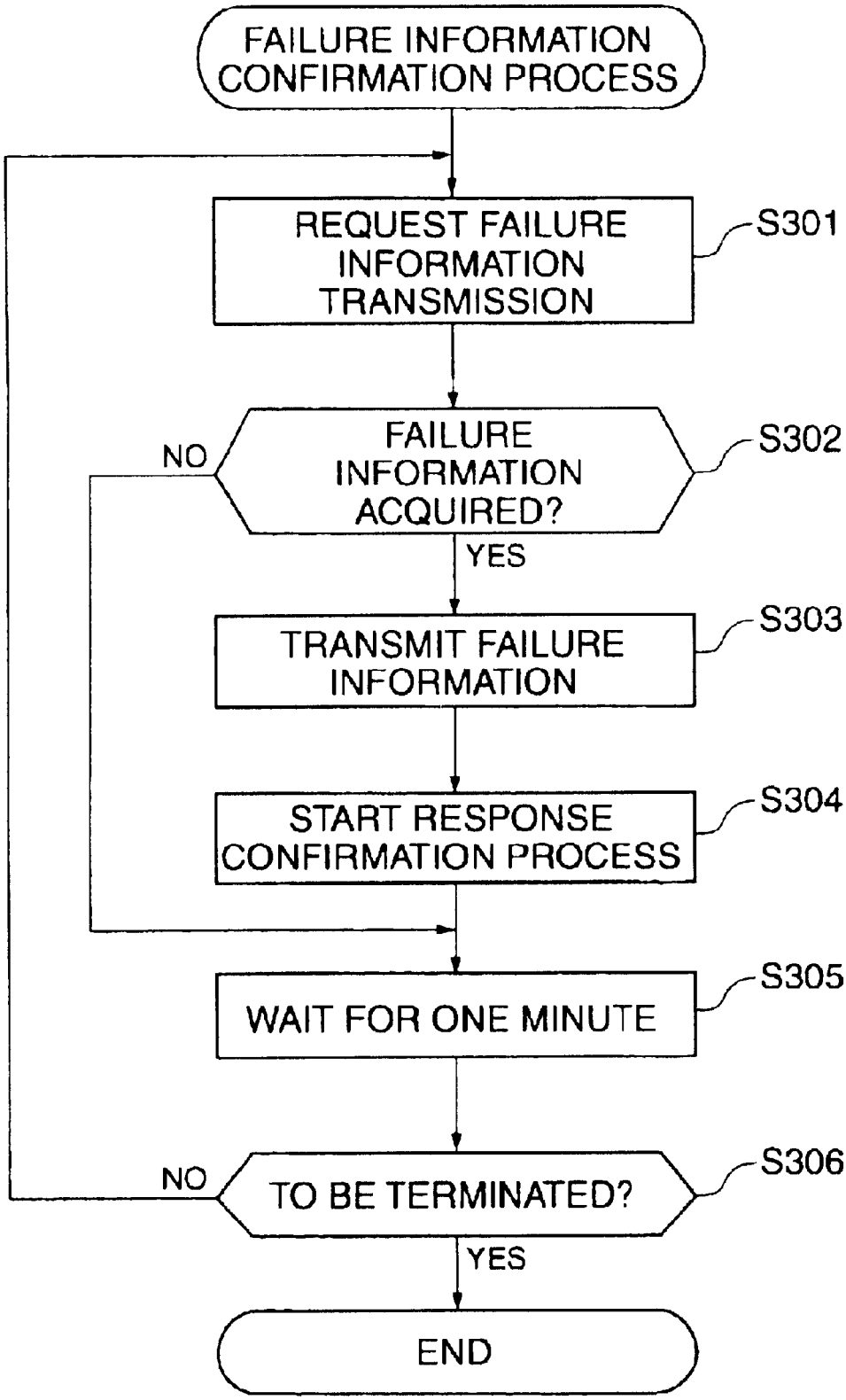
FIG. 3 is a flow chart showing the procedure of a failure information confirmation process executed by the monitoring apparatus in FIG. 2.

FIG. 3 is a flow chart showing the procedure of a failure information confirmation process executed by the monitoring apparatus of FIG. 2. It should be noted that, in the process shown in FIG. 3, information transmission from the monitoring apparatus 1 to the terminal side management server 2, center side management server 6 and PC 7 is carried out using SMTP (Simple Mail Transfer Protocol), and information reception therefrom is carried out using POP (Post Office Protocol).

In a step S301, the monitoring apparatus 1 makes a request to the image forming apparatuses 3–5 and the PC 12 to transmit failure information via the network 9 using a specific protocol.

First, in a step S302, it is determined whether or not the monitoring apparatus 1 has acquired failure information from the image forming apparatuses 3–5 and PC 12 as a result of the transmission request of the step S301. If the monitoring apparatus 1 has acquired the failure information, the process then proceeds to a step S303, where the acquired failure information is transmitted to the terminal side management server 2 or the center side management server 6, and the process then proceeds to a step S304. If the monitoring apparatus 1 has not acquired the failure information, the process then proceeds to a step S305.

In the step S304, a response confirmation process of FIG. 4 (described later) is commenced in order to confirm that the failure information has been properly transmitted to the terminal side management server 2 or the center side management server 6. Thereafter, in the step S305, the apparatus enters a standby mode to wait for a predetermined time period (for example 1 minute).

In a step S306, it is determined whether or not there has been an instruction to terminate the failure information confirmation process during the standby mode of the predetermined time period of the step S305. If there has been an instruction to terminate, then the present program process is terminated. If there has been no such an instruction, the process then returns to the step S301.

Figure 4:
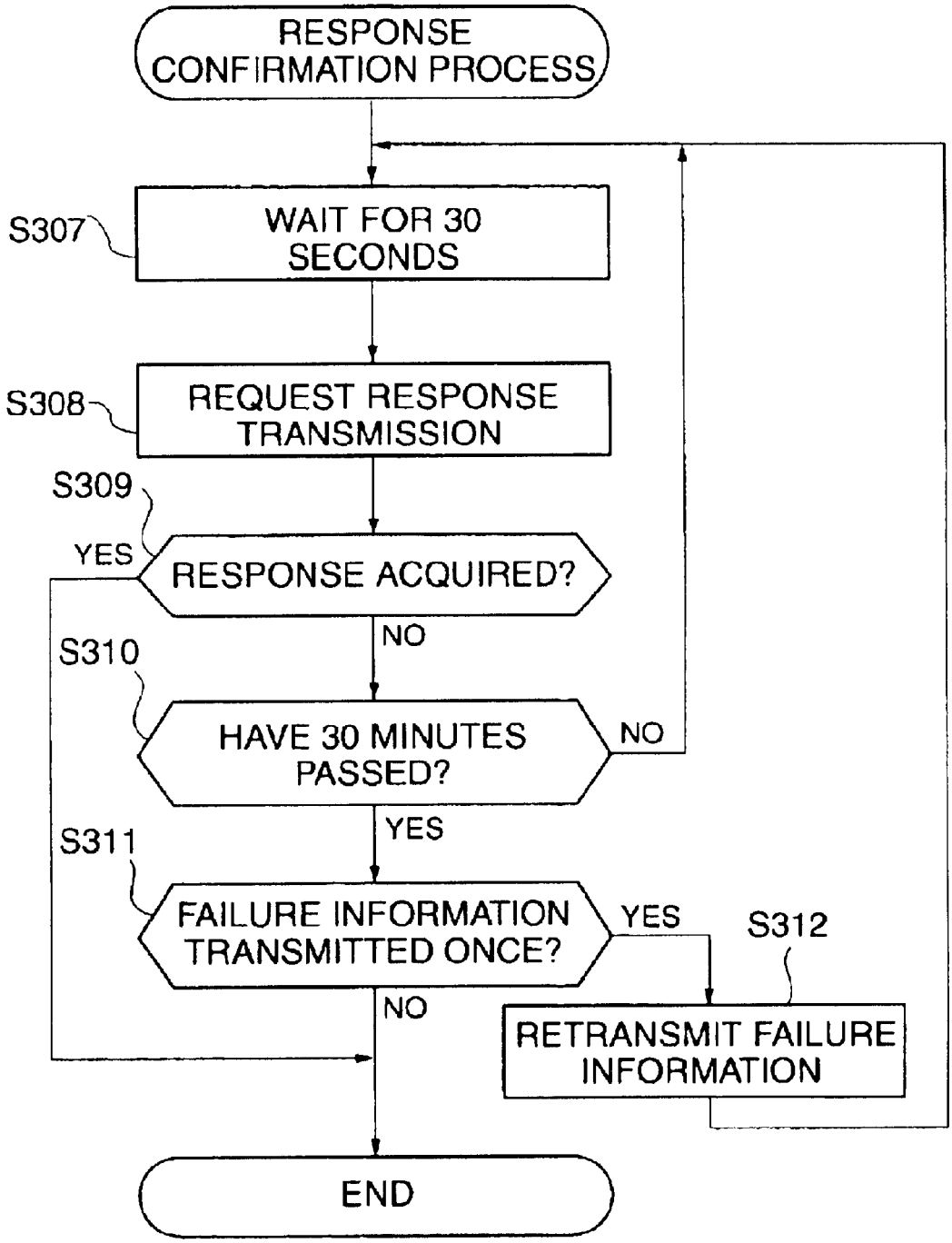
FIG. 4 is a flow chart showing the procedure of a response confirmation process of a step S304 in FIG. 3.

FIG. 4 is a flow chart showing the procedure of the response confirmation process of the step S304 in FIG. 3.

In FIG. 4, first, in a step S307, the monitoring apparatus 1 waits in a standby mode for a predetermined time period (for example 30 seconds).

In a step S308, a transmission request for a response to the failure information transmitted in the step S303 is sent to the terminal side management server 2 or the center side management server 6 via the network 9 using a specific protocol.

In a step S309, it is determined whether or not the monitoring apparatus 1 has acquired failure information from the terminal side management server 2 and the center side management server 6 as a result of the transmission request of the step S308. If the monitoring apparatus 1 has acquired the failure information, the process is then terminated. If the monitoring apparatus 1 has not acquired the failure information, the process then proceeds to a step S310 where it is determined whether or not a predetermined response confirmation maximum time period (for example 30 minutes) has elapsed. If the predetermined response confirmation maximum time period has not elapsed, the process then returns to the step S307. If the predetermined response confirmation maximum time period has elapsed, the process then proceeds to a step S311.

In the step S311, it is determined whether or not the number of times the monitoring apparatus 1 has sent failure information to the terminal side management server 2 or the center side management server 6 via the process of the step S303 up to now is 1. If it is determined that the number of times is 1, then it is determined that the failure information has been transmitted for the first time, and the process then proceeds to a step S312, where failure information is once again transmitted to the terminal side management server 2 or the center side management server 6, after which the process then returns to the step S307. If it is determined that the number of times is not 1, then the present program process is terminated. It should be noted that although in the present process it is determined whether or not the number of times failure information has been transmitted is 1, the present invention is not limited to such and instead it may be determined whether or not the number of times failure information has been transmitted is at or below a predetermined number of times.

Next, a description will be given of a process of collecting count information carried out by the monitoring apparatus 1 with reference to FIG. 5 and FIG. 6. The count information is the above-mentioned operation information pertaining to the image forming apparatuses 3–5 and the PC 12. The collection process is composed of a count information acquisition process and a count information transmission process.

Figure 5:
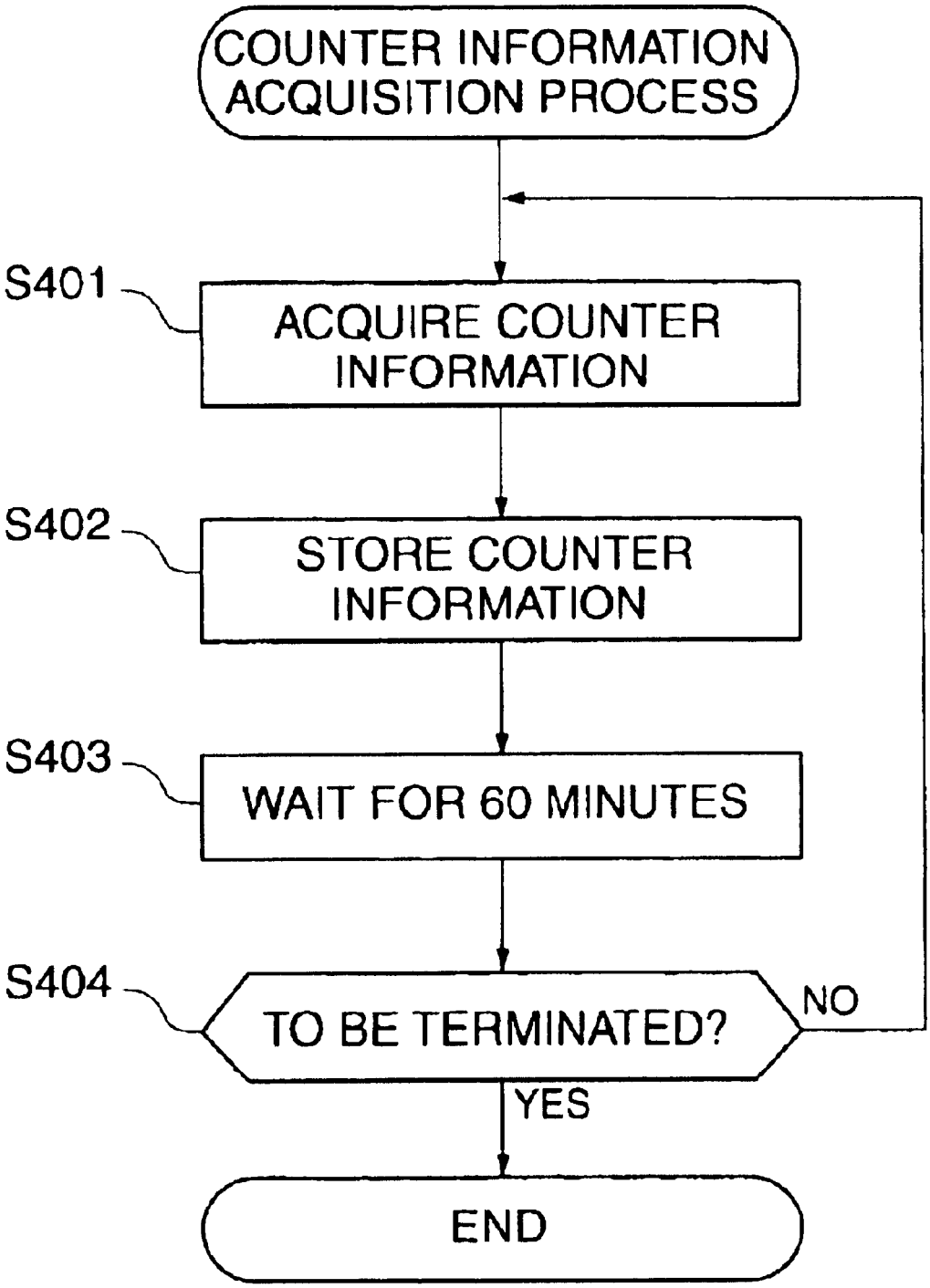
FIG. 5 is a flow chart showing the procedure of a count information acquisition process executed by the monitoring apparatus in FIG. 2.

FIG. 5 is a flow chart showing the procedure of the count information acquisition process executed by the monitoring apparatus of FIG. 2. This process is executed for each of the image forming apparatuses 3–5 and the PC 12.

In a step S401, the monitoring apparatus 1 acquires image forming apparatuses 3–5 and PC 12 count information via the network 9 using a specific protocol.

In a step S402, the monitoring apparatus 1 stores the count information acquired from the image forming apparatuses 3–5 and the PC 12 in a memory (that is, the RAM 203). It should be noted that, in those cases in which the format of the data that the monitoring apparatus 1 acquires from the image forming apparatuses 3–5 and the PC 12 differs from the format of the data to be transmitted to the terminal side management server 2 or the center side management server 6, the data may be converted in format when it is being stored in the memory. Alternatively, the data may be converted when there is a count information transmission request from the terminal side management server 2 or the center side management server 6.

In a step S403, the monitoring apparatus 1 enters a standby mode to wait for a predetermined time period (for example 60 minutes).

In a step S404, it is determined whether or not there has been an instruction to terminate the count information acquisition process during the predetermined time period of the step S403. If there has been such an instruction, the process is then terminated. If there has not been any such instruction, the process then returns to the step S401 and the present process is repeated.

Figure 6:
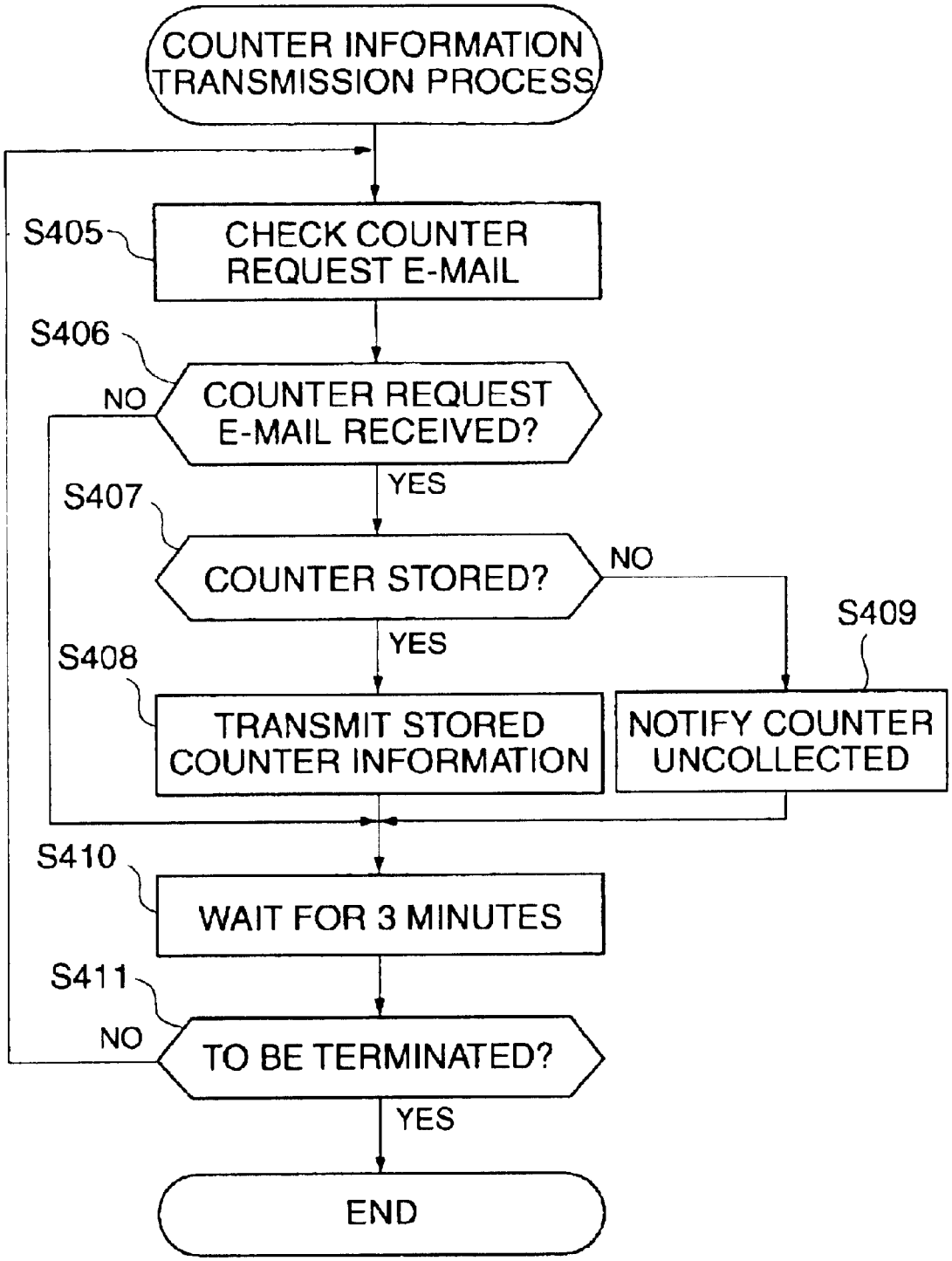
FIG. 6 is a flow chart showing the procedure of a count information transmission process executed by the monitoring apparatus in FIG. 2.

FIG. 6 is a flow chart showing the procedure of the count information transmission process executed by the monitoring apparatus of FIG. 2.

In a step S405, the monitoring apparatus 1 checks whether or not a count information transmission request e-mail addressed to the monitoring apparatus 1 from the terminal side management server 2 or the center side management server 6 exists inside a POP server that receives an e-mails and transfers that e-mail to the e-mail address to which that e-mail is addressed.

In a step S406, if it is determined from the results of the check performed in the step S405 that there is a count information transmission request e-mail in the POP server, the process then proceeds to a step S407. If it is determined that there is no count information transmission request e-mail in the POP server, the process then proceeds to a step S410.

In the step S407, it is determined whether or not count information is stored in the memory (RAM 203). If count information is stored in the memory, the process then proceeds to a step S408 and the stored count information is transmitted to the terminal side management server 2 or the center side management server 6. Count information transmitted to the center side management server 6 is shared by the PC 7 as described above, and can, for example, be referred to by an operator.

If in the step S407 it is determined that count information is not stored in the memory (RAM 203), the process then proceeds to a step S409 where information indicating that count information is uncollected is transmitted to the terminal side management server 2 or the center side management server 6.

In the step S410, the monitoring apparatus 1 enters a standby mode to wait for a predetermined time period (for example 3 minutes).

In a step S411, it is determined whether or not there has been an instruction to terminate the count information transmission process during the predetermined standby time period. If there has been such an instruction, the process is then terminated. If there has not been any such instruction, the process then returns to the step S405 and the present process is repeated.

It should be noted that, if it is determined in the step S406 that there is no count information transmission request e-mail in the POP server, the process then proceeds to the steps S410 and S411, and the processing of the steps S405 through S410 is repeated until it is determined that there has been an instruction to terminate the process.

By the execution of the above described processes of FIGS. 3 through 6, maintenance information of the image forming apparatuses 3 to 5 and the PC 12 used by users can be remotely managed in a centralized manner by the center side management server 6 or the PC 7.

Next, a description will be given of controllers that control the image forming apparatuses 3, 4 and 5 with reference to FIG. 7. All the controllers have the same construction, and therefore the following description refers to only the controller for the image forming apparatus 3.

Figure 7:
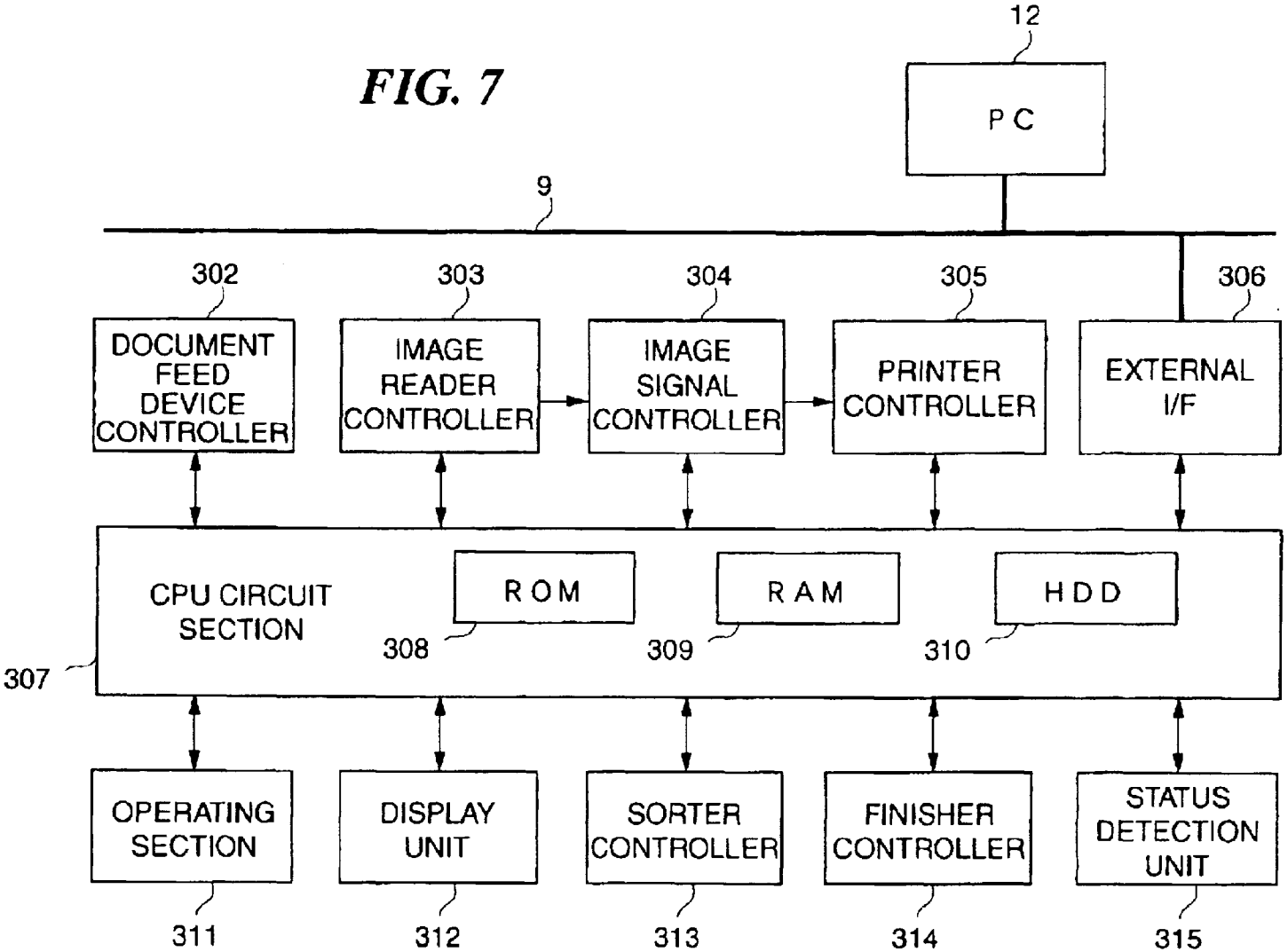
FIG. 7 is a block diagram showing the arrangement of a controller that controls one of the image forming apparatuses in FIG. 1.

FIG. 7 is a block diagram showing the arrangement of a controller that controls one of the image forming apparatuses appearing in FIG. 1.

As shown in FIG. 7, the controller has a CPU circuit section 307. The CPU circuit section 307 is provided with a CPU, not shown, a ROM 308, a RAM 309 and a hard disk drive (HDD) 310, and controls all components 302, 303, 304, 305, 306, 311, 312, 313, 314 and 315, described later, according to control programs stored in the ROM 308. The RAM 309 temporarily holds control data and is used as a work area for calculations performed by the CPU. The HDD 310 stores information necessary to control programs as well as information received from the components 302, 303, 304, 305, 306, 311, 312, 313, 314 and 315.

A document feed device controller 302 drives a document feed device, not shown, based on instructions from the CPU circuit section 307. An image reader controller 303 drives a scanner unit, not shown, an image sensor, not shown, and others, and transfers an analog image signal output from the image sensor to an image signal controller 304.

An image signal controller 304 converts the received analog image signal into a digital signal and performs various types of image processing on the digital signal. Thereafter, the digital signal is converted into a video signal which is output to a printer controller 305. The processing operations of the image signal controller 304 are controlled by the CPU circuit section 307.

An external I/F 306 performs various types of image processing on the digital image signals input from the PC 12 via the network 9, converts the digital image signals into video signals and outputs them to the printer controller 305. Further, the external I/F 306 communicates with a monitoring apparatus 1, not shown, via the network 9.

The printer controller 305 drives an exposure controller, not shown, based on a video signal input from the image signal controller 304 or the external I/F 306 as described above.

An operating section 311 has a plurality of keys for setting a variety of functions related to image formation, and outputs key signals corresponding to the keys operated to the CPU circuit section 307. A display unit 312 displays the setting status determined by the operating section 311 and also displays corresponding information based on signals from the CPU circuit section 307.

A sorter controller 313 and a finisher controller 314 operate according to signals output from the CPU circuit section 307 based on input from the user via the external I/F 306 or on settings from the operating section 311. A status detection unit 315 collects status information from the components, determines if any abnormality has been detected, and notifies the CPU circuit section 307 of the results of that determination. Based on that notification, the CPU circuit section 307 causes the display unit 312 to display a malfunction and notifies the PC 12 of a malfunction via the external I/F 306.

Figure 8:
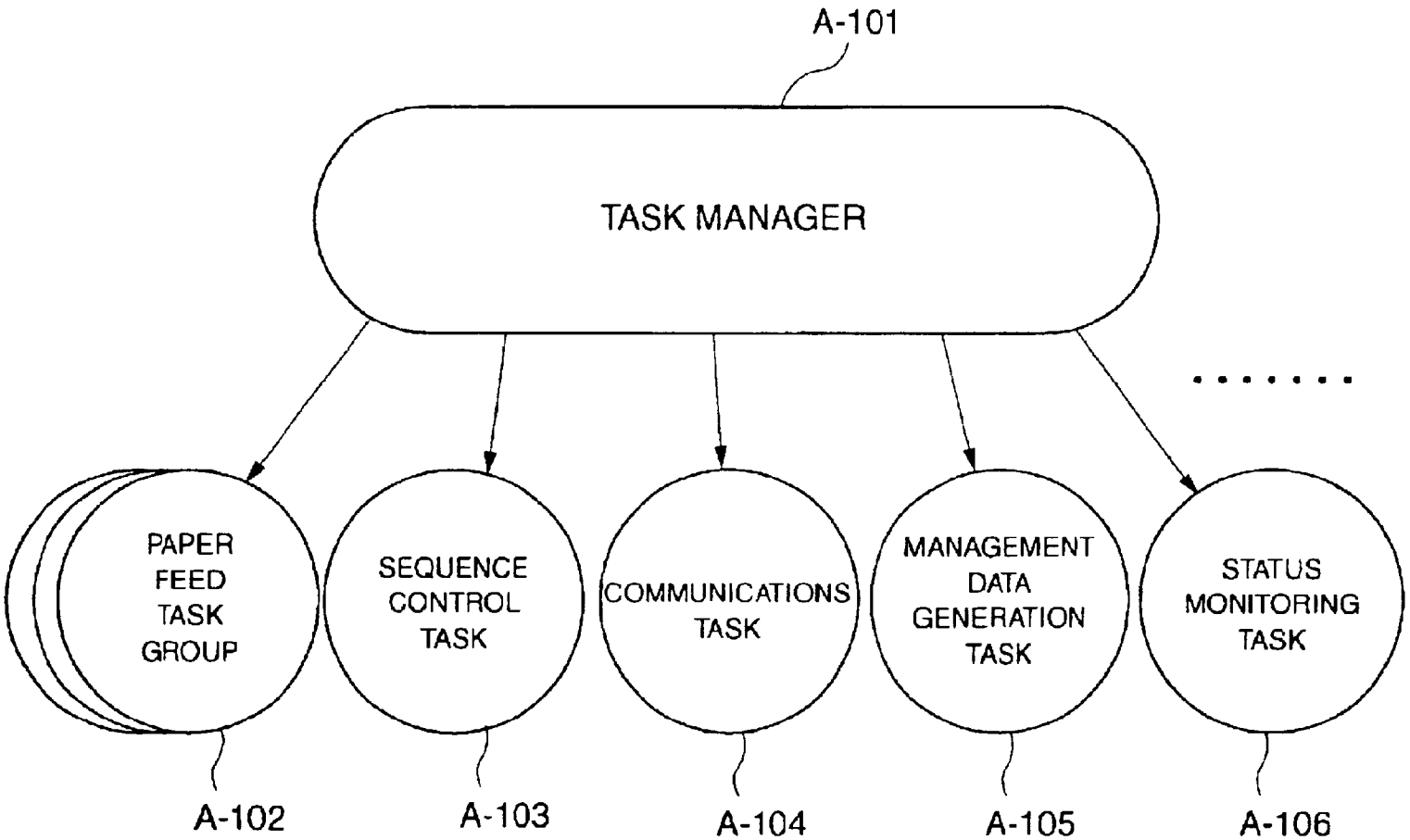
FIG. 8 is a diagram showing the software (task) configuration of one of the image forming apparatuses in FIG. 1.

FIG. 8 is a diagram showing the software (task) configuration of one of the image forming apparatuses in FIG. 1.

A task manager a-101 manages a plurality of tasks simultaneously. A paper feed task group A-102 controls conveyance of documents and of sheets on which images are to be formed. A sequence control task A-103 manages the image forming apparatus 3 as a whole. A communication task A-104 communicates with a monitoring apparatus 1. A management data generation task A-105 generates remote control management data according to the present embodiment.

The image forming apparatus 3 counts operation information separately for paper size, mode, paper type and color with every image formation. This count is carried out by the control data generation task A-105, and is stored in the memory (RAM 309 or the like) in the image forming apparatus 3.

Similarly, status information (failure information) such as jams, errors, alarms, etc., is stored in the image forming apparatus 3 by the management data generation task A-105 in a predetermined data format.

Further, replacement life information on consumable component parts for each component in the image forming apparatus is held, as well as a counter value that indicates the number of times used, and this information is stored in the above-described memory of the image forming apparatus 3 by the management data generation task A-105.

A status monitoring task A-106 detects abnormalities in the image forming apparatus 3 (that is, jams, errors, alarms, etc.) and detects changes in the status of predetermined component parts. The results of such detection are stored in the memory of the image forming apparatus 3 via the management data generation task A-105.

The information stored in the memory is transmitted from the image forming apparatus 3 to the monitoring apparatus 1 at certain predetermined time intervals and in response to requests from the monitoring apparatus 1.

Figure 9:
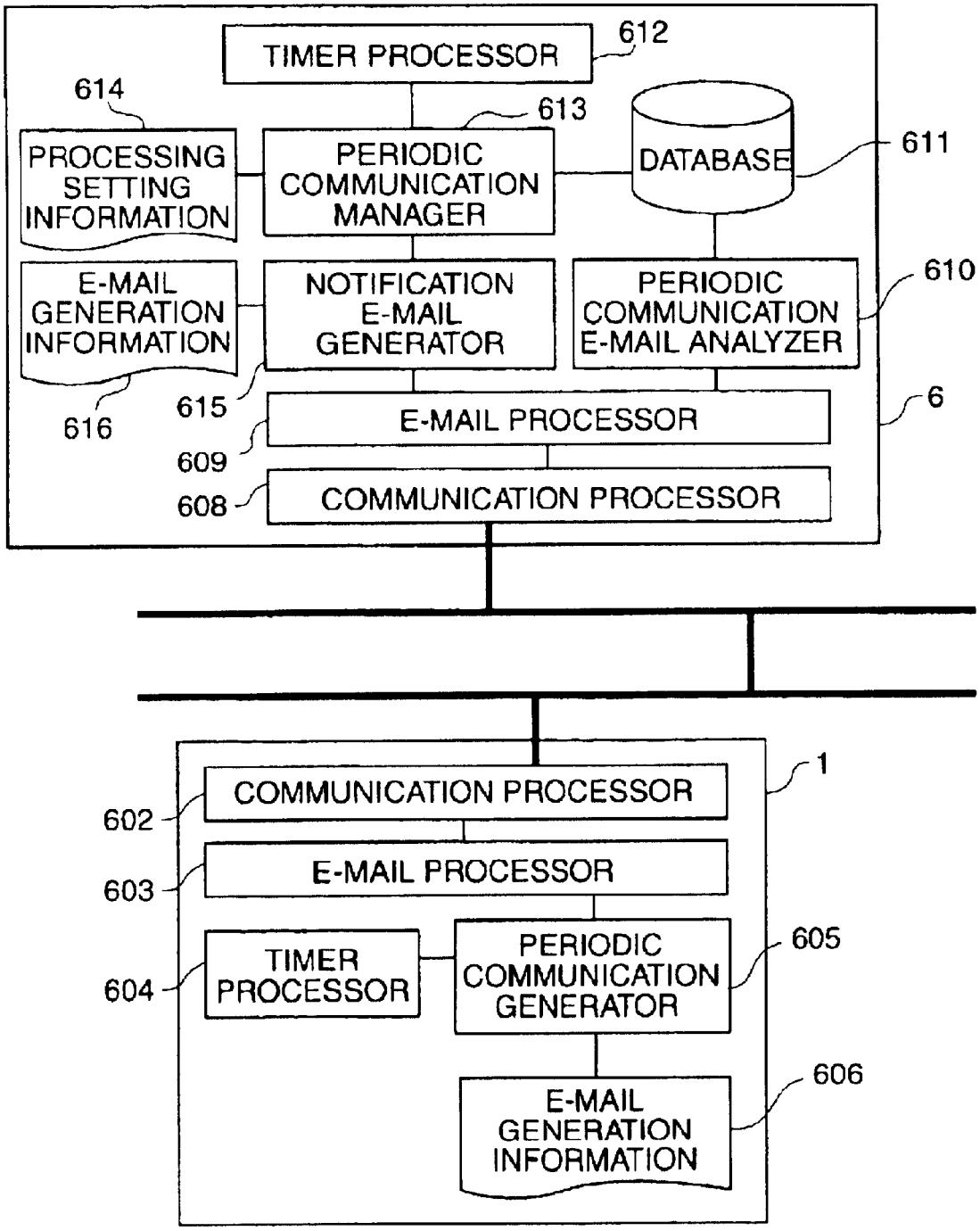
FIG. 9 is a block diagram showing the internal functional structure of the monitoring apparatus and the management apparatus (center side management server) in FIG. 1.

FIG. 9 is a block diagram showing the internal functional structure of the monitoring apparatus and center side management server in FIG. 1. It should be noted that the center side management server 6 may be replaced by the PC 7 or by an apparatus that is a combination of the center side management server 6 and the PC 7. Further, the monitoring apparatus 1 may be replaced by the terminal side management server 2 or by an apparatus that is a combination of the monitoring apparatus 1 and the terminal side management server 2.

The monitoring apparatus 1 is comprised of a communication processor 602 for external communications, an e-mail processor 603 for transmitting e-mails, a timer processor 604 for managing program tasks in the monitoring apparatus 1, a periodic communication generator 605 for periodically generating and transmitting e-mails, and e-mail generation information 606 consisting of information necessary for the generation of e-mails.

The center side management server 6 is comprised of a communication processor 608 for external communications, an e-mail processor 609 for receiving and transferring e-mails to a periodic communication e-mail analyzer 610, the periodic communication e-mail analyzer 610 for analyzing received e-mails, a database 611 for storing information acquired by analyzing the e-mails, a timer processor 612 for carrying out task management of programs in the center side management server 6, processing setting information 614 indicating the type of processing to be performed by a periodic communication manager 613, described later, a notification e-mail generator 615 for generating a notification e-mail, and e-mail generation information 616 consisting of information necessary to the generation of e-mail by the notification e-mail generator 615. The periodic communication manager 613 periodically monitors the database 611, performs processing according to operating procedure conditions given by the processing setting information 614, and, according to the processing results, asks the notification e-mail generator 615 to generate a notification e-mail.

Figure 10:
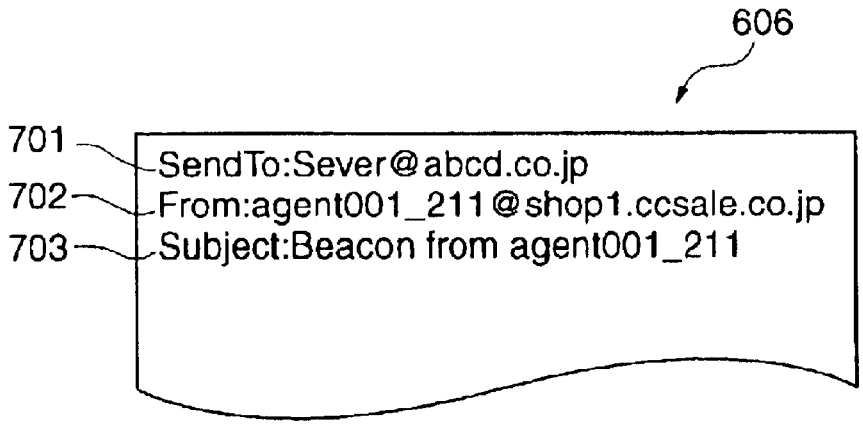
FIG. 10 is a diagram showing an example of e-mail generation information in FIG. 9.

FIG. 10 is a diagram showing an example of e-mail generation information in FIG. 9.

The e-mail generation information 606 is comprised of at least an e-mail recipient address 701, an e-mail sender address 702 and subject information 703. It should be noted that information relating to the e-mail transmission and reception, for example the SMTP server address, the POP server address and the verification information for the servers, etc., is held in the e-mail processor 603 and is not included in the e-mail generation information 606. Moreover, the communication processor 602 has its own IP address and net mask, as well as a gateway address for external communications. Information for processing for external communications is not included in the e-mail generation information 606.

Figure 11:
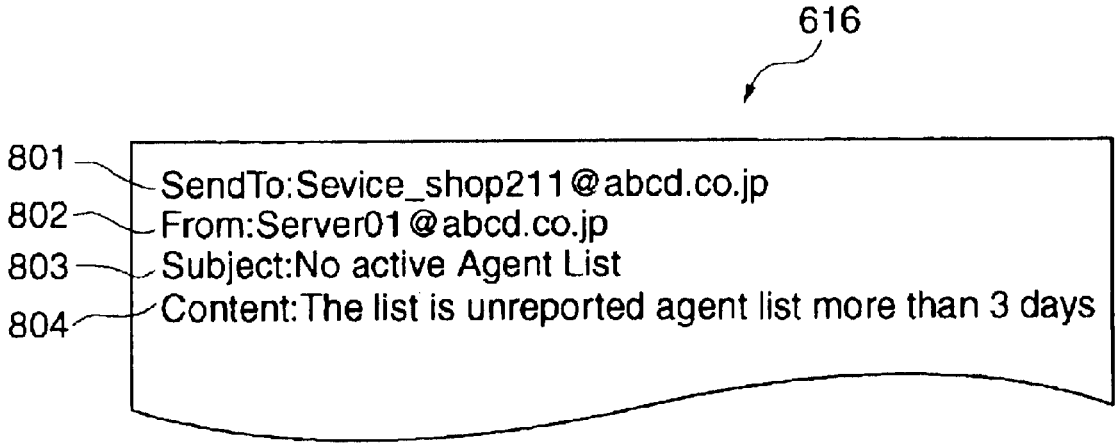
FIG. 11 is a diagram showing another example of e-mail generation information in FIG. 9.

FIG. 11 is a diagram showing an example of the e-mail generation information 616 in FIG. 9.

The notification e-mail generator 616 has an e-mail recipient address 801, an e-mail sender address 802, subject information 803 indicating that this e-mail is for the purpose of transmitting a list of malfunctioning monitoring apparatuses, and an e-mail content template 804.

FIG. 12 is a diagram showing an example of the contents of an e-mail transmitted to the center side management server 6 from the monitoring apparatus 1.

To the e-mail from the monitoring apparatus 1 are added a recipient address 903, a sender address 902, a subject 904, a time of transmission 901 and sender information 905–909.

FIG. 13 is a diagram showing an example of the contents of an e-mail transmitted to a preset sender from the center side management server 6.

To the e-mail from the center side management server 6 are added a recipient address 1003, a sender address 1002, and a subject 1004. In addition, detailed contents 1010 generated from the e-mail content template 804 are also added, together with a time of transmission 1001 and sender information 1005–1009.

Next, a description will be given of the processing operations of the monitoring apparatus 1 and the center side management server 6 with reference to FIG. 14, FIG. 15 and FIG. 16.

Figure 14:
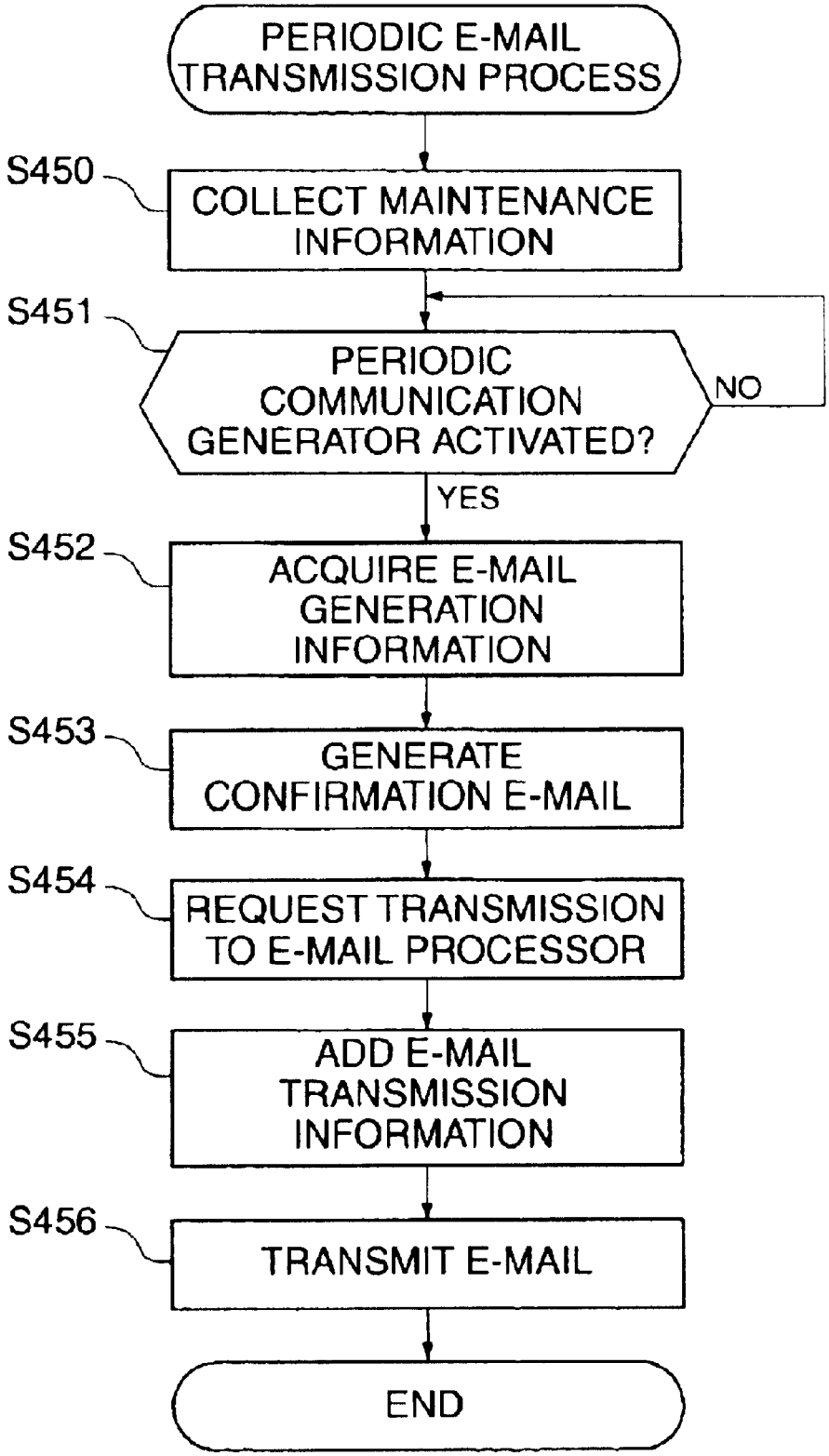
FIG. 14 is a flow chart showing the procedure of a periodic e-mail transmission process executed by the monitoring apparatus in FIG. 1.

FIG. 14 is a flow chart showing the procedure of a periodic e-mail transmission process executed by the monitoring apparatus 1 in FIG. 1.

In FIG. 14, first, in a step S450, the monitoring apparatus 1 collects maintenance information from a plurality of peripheral apparatuses including the image forming apparatuses 3–5 and the PC 12 and stores the maintenance information in a memory (RAM 203).

Next, the monitoring apparatus 1 determines whether or not the periodic communication generator 605, which is activated periodically according to a signal from the timer processor 604, has been activated (step S451). If it is determined in the step S451 that the periodic communication generator 605 has been activated, then the monitoring apparatus 1 acquires from the e-mail generation information 606 such e-mail generation information as the sender ID, the recipient (that is, the center side management server 6) address and the subject information (step S452), generates a confirmatory e-mail indicating that the monitoring apparatus 1 itself has a properly operating communication capability (step S453), and requests the e-mail processor 603 to transmit the confirmatory e-mail (step S454). The e-mail processor 603, when it receives the request to transmit the a confirmatory e-mail, adds such e-mail transmission information necessary for e-mail exchange as a message ID, date, and so forth (step S455), and transmits the e-mail to an external server via the communication processor 602 (step S456). It should be noted that maintenance information stored in the memory (RAM 203) is included in the confirmatory e-mail.

Figure 15:
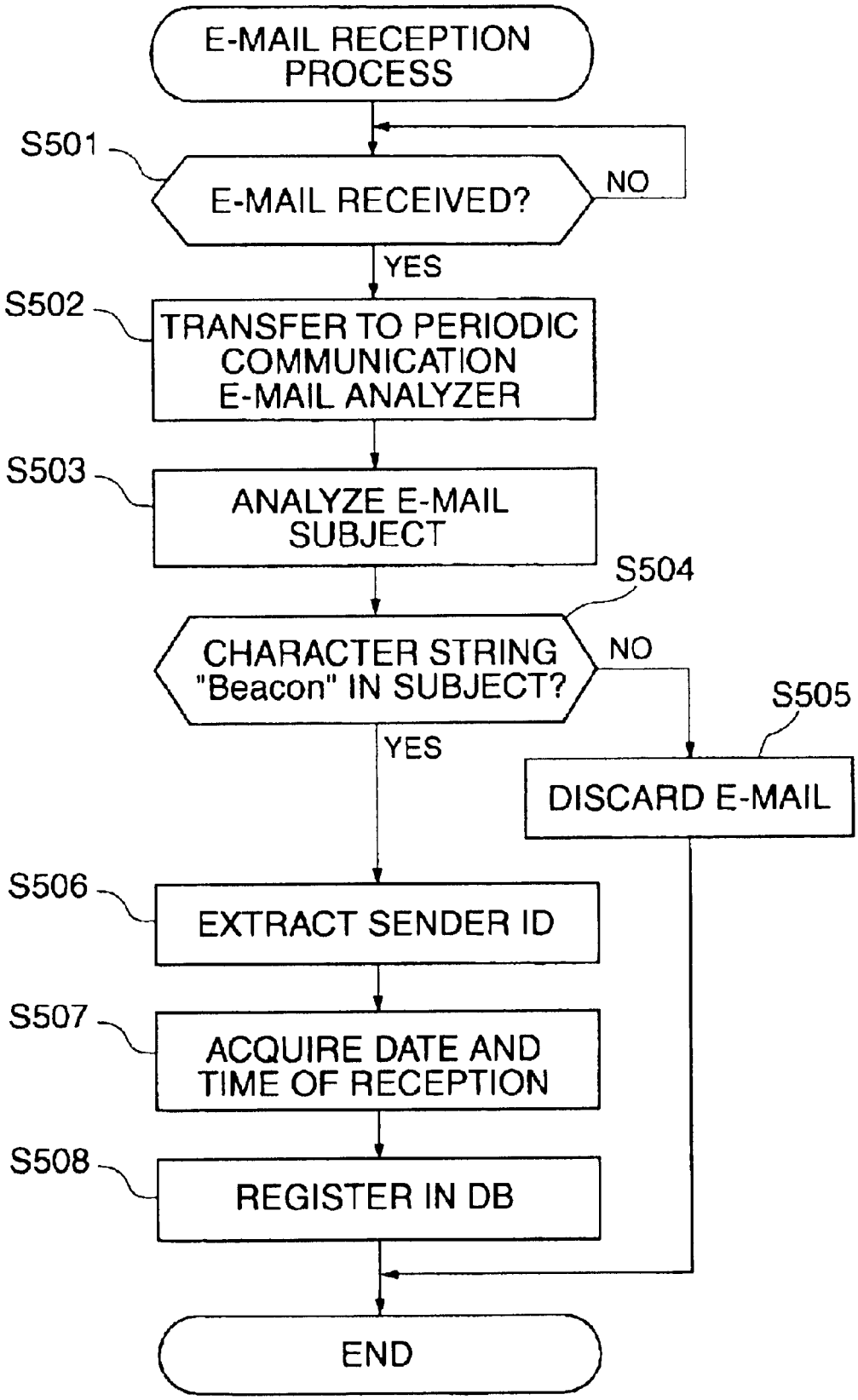
FIG. 15 is a flow chart showing the procedure of an e-mail reception process executed by the center side management server in FIG. 1.

FIG. 15 is a flow chart showing the procedure of an e-mail reception process executed by the center side management server 6 of FIG. 1. It should be noted that, in a step S502 of the present process, an e-mail is received from any of the plurality of monitoring apparatuses under management.

In FIG. 15, first, when the communication processor 608 of the center side management server 6 receives an e-mail addressed to the center side management server 6 ("YES" to a step S501), the communication processor 608 delivers the received e-mail via the e-mail processor 609 to the periodic communication e-mail analyzer 610 (step S502).

At the periodic communication e-mail analyzer 610, the subject of the transferred e-mail is analyzed (step S503), from a result of which it is determined whether or not a character string (e.g., "Beacon") indicating that the e-mail is a previously set periodically transmitted e-mail is in the subject (step S504). If "Beacon" is in the subject, then the received e-mail is deemed to be a periodically transmitted e-mail (that is, a confirmatory e-mail) and the process then proceeds to a step S506. If the setting of "Beacon" is not in the subject, then the received e-mail is deemed not to be a periodically transmitted e-mail (confirmatory e-mail) and the received e-mail is discarded (step S505).

In the step S506, the periodic communication e-mail analyzer 610 extracts the sender ID from the subject of the received e-mail (step S506). The periodically transmitted e-mail (confirmatory e-mail) can be sent from any of the plurality of monitoring apparatuses, and therefore the monitoring apparatus from which the e-mail is sent can be identified from the sender ID. In the example shown in FIG. 12 described above, the subject is "Beacon from agent 001_211", with the "agent 001_211" character string after the word "from" being the sender ID.

Then, the periodic communication e-mail analyzer 610 acquires the date and time the e-mail was received from the timer processor 612 of the center side management server 6 (step S507). Information of the correspondence between the sender ID and the date and time is registered in the database 611 as DB information (step S508) and the process is then terminated. If DB information pertaining to the same sender ID is already registered in the database 611, then the date and time of that DB information are updated.

It should be noted that maintenance information included in the received e-mail is also stored in the database 611. DB information registered/updated in the database 611 is generated at the center side management server 6 based on the processing of the step S508. In this way, notification is executed based on monitoring of the notification transmission schedule by each of the monitoring apparatuses, and in response to this notification, the steps S501 through S508 are executed, thus eliminating the need for the center side management server 6 to perform two information transfers (that is, transmission of a response request and reception of the response) as well as eliminating the need for the management server to make either simultaneous or staggered response request transmissions to the plurality of monitoring apparatuses, thereby making it possible to reduce the monitoring apparatus management processing load.

Moreover, although e-mails from the plurality of monitoring apparatuses are received at the center side management server 6 in the step S502, it is desirable that the timing of such notification e-mails from the monitoring apparatuses in the step S502 be not congested. For this reason, the timing of the transmission of notification e-mails is set at each monitoring apparatus 1 in such a way as to prevent the timing of such notification e-mails in the step S502 from being congested. Moreover, in order to change the timing of the transmission of the notification e-mails at each monitoring apparatus, the center side management server 6 has a means (communication processor 608) for instructing all of the plurality of monitoring apparatuses to update the notification transmission timing for all of a plurality of monitoring apparatuses at once, and the monitoring apparatuses are each equipped with a function for updating the notification e-mail transmission timing as instructed.

Figure 16:
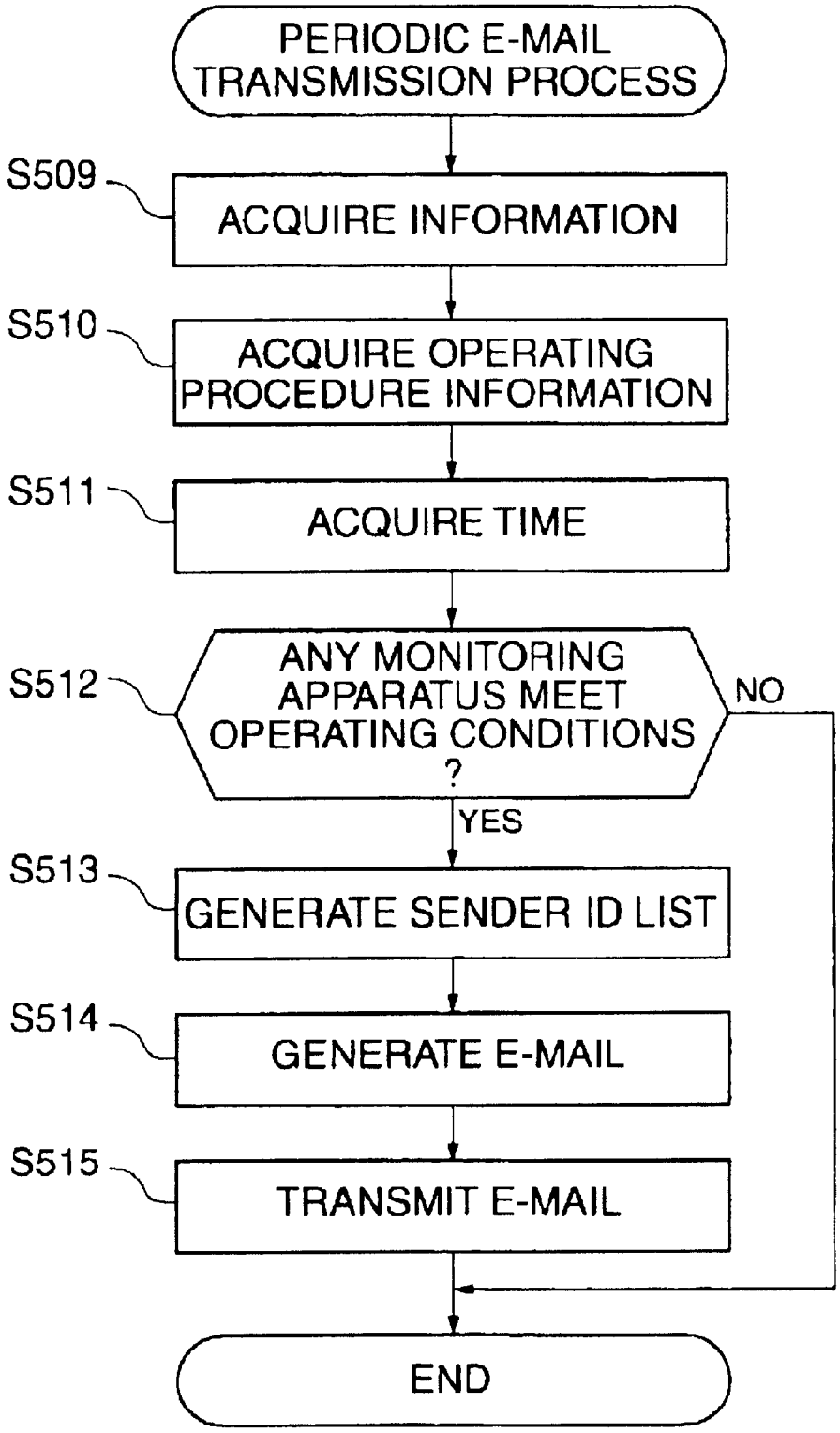
FIG. 16 is a flow chart showing the procedure of a periodic e-mail transmission process executed by the center side management in FIG. 1.

FIG. 16 is a flow chart showing the procedure of a periodic e-mail transmission process executed by the center side management server in FIG. 1, in which a reply e-mail corresponding to an e-mail received through the e-mail reception process of FIG. 15 is transmitted to a plurality of monitoring apparatuses.

In FIG. 16, first, the periodic communication manager 613 of the center side management server 6 acquires both DB information stored in the database 611 (step S509) as well as operating procedure information from the processing setting information 614 (step S510), in the step S508 in FIG. 15 in predetermined timing instructed by the timer processor 612. The operating procedure information indicates the procedure of a process of identifying/selecting monitoring apparatus(s) that meet predetermined conditions of abnormality occurrence from the DB information stored in the database 611 by the periodic communication manager 613.

The processing setting information 614 shown in FIG. 9 includes, for example, operating procedure information that instructs the apparatus to "search for monitoring apparatuses that have not transmitted periodically e-mail for three days or more, make a list of the sender IDs of such monitoring apparatuses, and transmit a notification e-mail with the list attached thereto". A description will now be given of the process of generating monitoring object management information processed according to the above-described operating procedure information. Of course, as the above predetermined conditions the present invention is not limited to those illustrated here, and predetermined conditions that take into account an appropriate client environment are stored in the processing setting information 614.

Returning to FIG. 16, first, the periodic communication manager 613 acquires the current time from the timer processor 612 of the center side management server 6 (step S511) according to the operating procedure information acquired in the step S510.

Next, the periodic communication manager 613 determines whether or not there is a monitoring apparatus meeting the conditions of the operating procedure (step S512). Specifically, in the present process, since a monitoring apparatus that has not transmitted periodically transmitted e-mail for 3 days or more meets the conditions of the operating procedure, then the periodic communication manager 613 decides that there is a monitoring apparatus that meets the conditions of the operating procedure whenever there is DB information registered in the database 611 in the step S508 of FIG. 15 having a date and time that is 3 days old or older, and decides that there is no monitoring apparatus that meets the conditions of the operating procedure whenever there is no DB information having a date and time that is 3 days old or older.

If as a result of the determination made in the step S512 there is a monitoring apparatus that meets the conditions of the operating procedure ("YES" to the step S512), then based on the DB information registered in the database 611 the periodic communication manager 613 generates, as post-processing monitoring object information, a list of sender IDs of monitoring apparatuses that meet the conditions of the operating procedure (step S513). On the other hand, if there is no monitoring apparatus that meets the conditions of the operating procedure ("NO" to the step S512) the process is then terminated.

Based on the e-mail generation information 616, the notification e-mail generator 615 then generates an e-mail (step S514) to which is attached as an attachment file the monitoring object management information generated by the periodic communication manager 613 in the step S513. An example of the e-mail generated here is shown in FIG. 13.

The e-mail thus generated is sent to monitoring apparatuses meeting the conditions of the operating procedure acquired in the step S512 via the e-mail processor 609 (step S515).

As described above, according to the first embodiment of the present invention, each of a plurality of monitoring apparatuses including the monitoring apparatus 1 periodically transmits e-mails to the center side management server 6, and the center side management server 6 receives the periodically transmitted e-mail, and determines whether or not there are monitoring apparatuses that have not sent e-mails over a predetermined time period and, if such monitoring apparatuses are present, transmits e-mails to these monitoring apparatuses notifying them of the abnormality.

Moreover, although in the first embodiment a particular character string included in the subject of the e-mail is used as the method by which the center side management server 6 determines whether or not a received e-mail is a periodically transmitted e-mail as shown in the step S504, alternatively a particular character string or code may be imbedded in the text of the e-mail in order to indicate that the e-mail is a periodically transmitted e-mail, or monitoring object senders' e-mail addresses may be pre-registered and the address of a received e-mail is compared with the pre-registered addresses to thereby determine whether or not the e-mail is a periodically transmitted e-mail.

Moreover, although in the first embodiment the periodic communication manager 613 of the center side management server 6 uses the time in the center side management server 6 as the reference for the date and time of reception of periodically transmitted e-mail, the transmission date recorded in the periodically transmitted e-mail may be used instead and in this case also the same effect is obtained. Further, although the periodic communication manager 613 extracts sender information from the subject of the e-mail as a method of identifying the sender of the transmission, alternatively a correspondence table correlating pre-registered sender addresses and sender information may be stored in a memory and a sender ID acquired from the sender address of the transmitted e-mail may be obtained using the correspondence table, or a sender ID may be recorded in the text of the e-mail and used to identify the sender. Still further, instead of a sender ID, a user name for the monitoring apparatus, an ID dedicated to the monitoring apparatus, a monitoring apparatus IP address or MAC address may be used.

Next, a description will be given of a management apparatus according to a second embodiment of the present invention.

The arrangement of the management apparatus according to the second embodiment and a remote monitoring system incorporating the management apparatus is basically the same as that of the first embodiment, and therefore the following description of the second embodiment is limited to only those parts that differ from the arrangement of the first embodiment.

Figure 17:
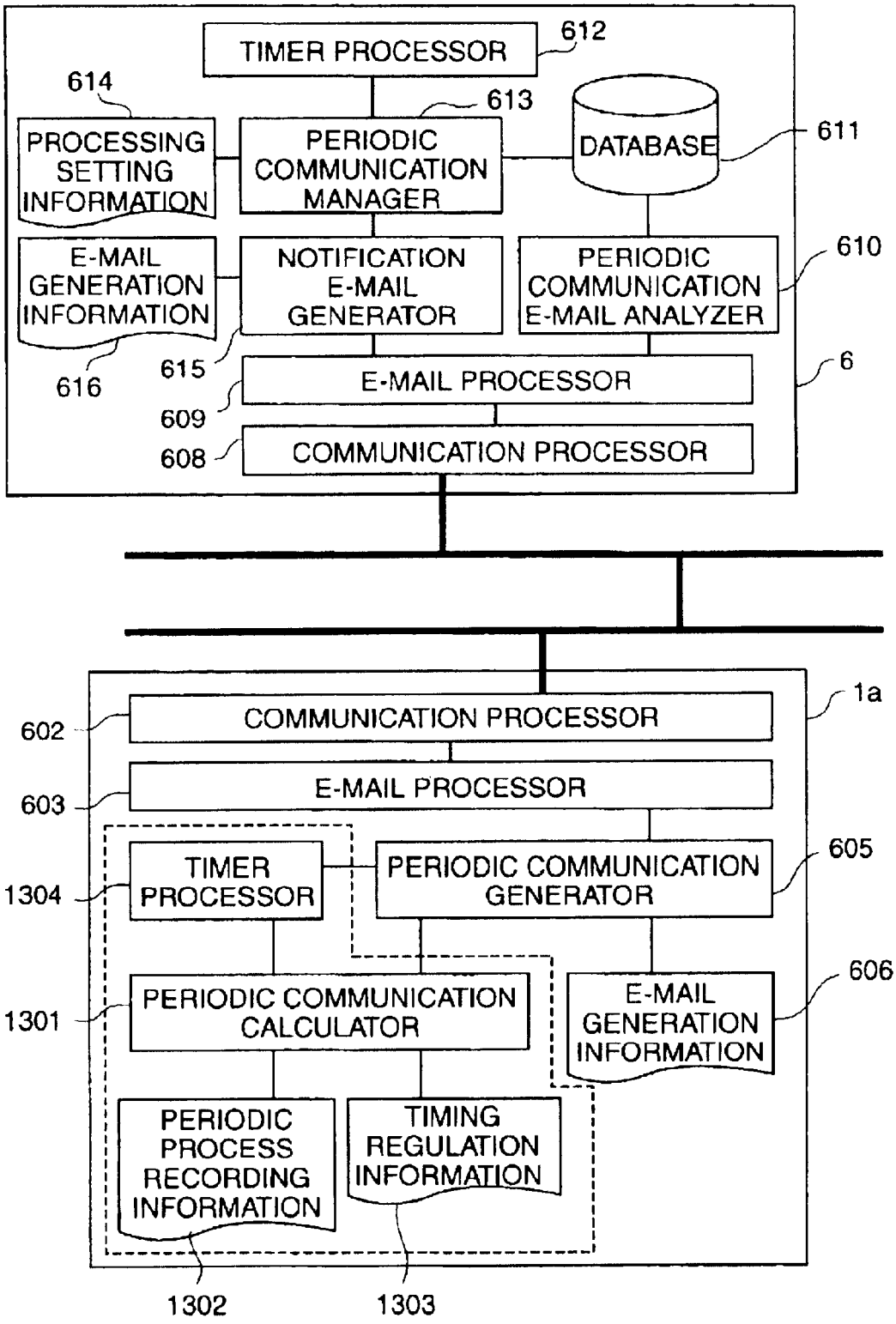
FIG. 17 is a block diagram showing the internal functional structure of a management apparatus and a management apparatus (center side management server) according to a second embodiment of the present invention.

FIG. 17 is a block diagram showing the internal functional structure of the management apparatus and the center side management server 6 according to the second embodiment. The monitoring apparatus 1a corresponds to the monitoring apparatus 1 of the first embodiment. It should be noted that, in the second embodiment as well, the center side management server 6 may be replaced by the PC7 or by an apparatus that is a combination of the center side management server 6 and the PC 7. Further, the monitoring apparatus 1a may be replaced by the terminal side management server 2 or by an apparatus that is a combination of the monitoring apparatus 1a and the terminal side management server 2.

In the second embodiment, as indicated by the dotted line in FIG. 17, the monitoring apparatus 1a differs from the monitoring apparatus 1 of the first embodiment in that the monitoring apparatus 1a is provided with a periodic communication calculator 1301, periodic process recording information 1302, timing regulation information 1303 and a timer processor 1304 in place of the timer processor 604 of the monitoring apparatus 1 according to the first embodiment. Except for this, the second embodiment is identical to the first embodiment.

The periodic communication calculator 1301 determines the timing of the next e-mail to be transmitted based on e-mail generation history information. The periodic process recording information 1302 is e-mail generation history information comprised of the time of transmission of the last e-mail, the number of times of e-mail transmissions, and the time when the next e-mail is to be transmitted. FIG. 18 shows an example of the periodic process recording information (e-mail generation history information). The timing regulation information 1303 is information relating to the time of transmission of the next e-mail to be transmitted, such as time of transmission in accordance with transmission time information, the contents of the transmitted e-mail and a set number of times of transmission. FIG. 19 shows an example of the timing regulation information. The timer processor 1304 performs task management of programs in the monitoring apparatus 1a. It should be noted that the timer processor 604 of the first embodiment may be used as the timer processor 1304 of the second embodiment.

FIG. 20 is a diagram showing an example of DB information held by a database 611 in the center side management server of FIG. 17.

The database 611 has recorded therein the sender ID and (last) reception date as with the first embodiment, and the next scheduled date of reception of transmission from each monitoring apparatus 1a.

Figure 21:
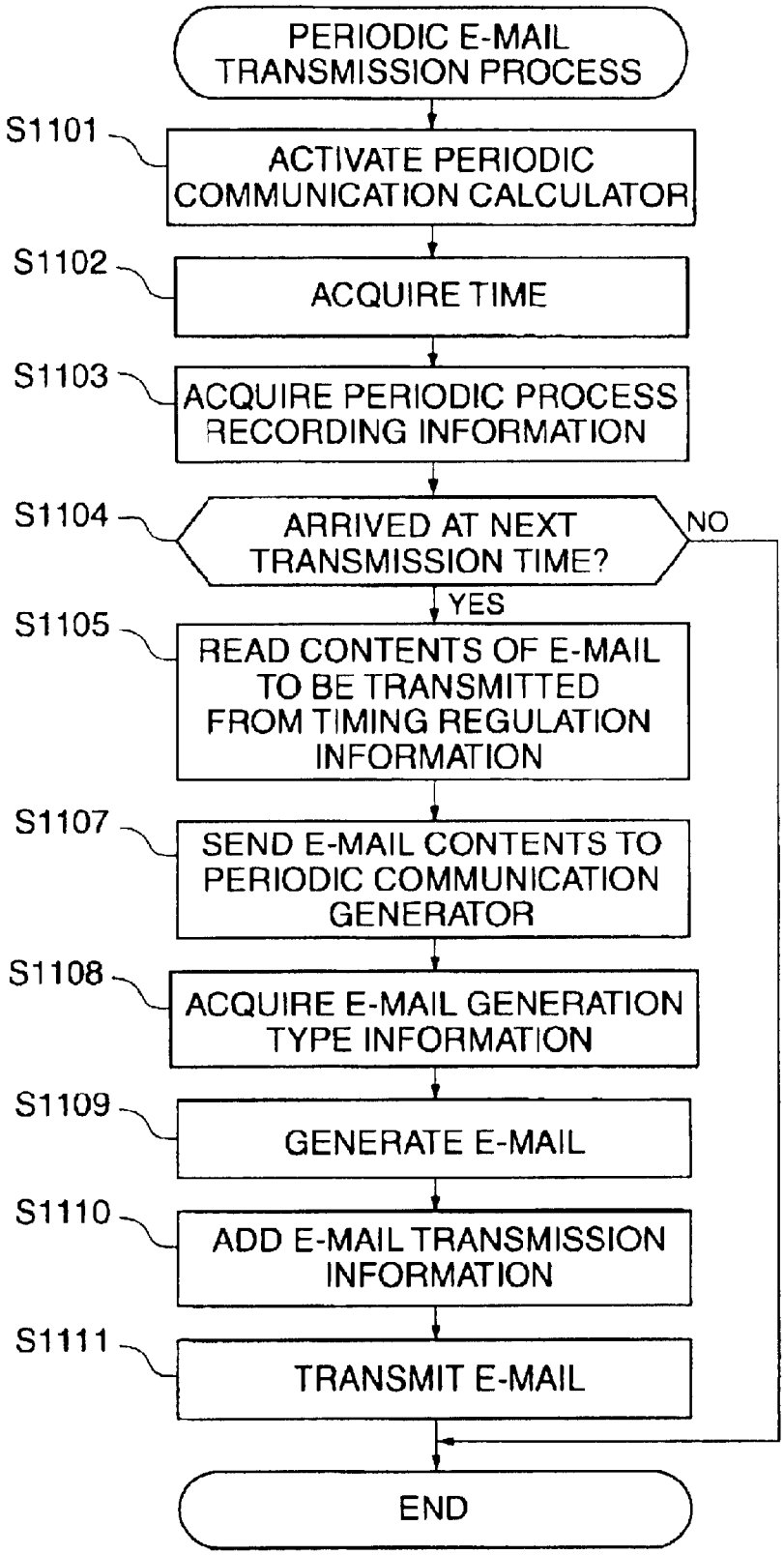
FIG. 21 is a flow chart showing the procedure of a periodic e-mail transmission process executed by a monitoring apparatus according to the second embodiment.

FIG. 21 is a flow chart showing the procedure of a periodic e-mail transmission process executed by the monitoring apparatus 1a according to the second embodiment.

In FIG. 21, the monitoring apparatus 1a periodically activates the periodic communication calculator 1301 according to a signal from the timer processor 1304 (step S1101). The activated periodic communication calculator 1301 then acquires the current time from the timer processor 1304 (step S1102). Then, the periodic communication calculator 1301 acquires the e-mail generation history information (periodic process recording information) from the periodic process recording information 1302 (step S1103) and based on that information determines whether or not the current time has arrived at the time of next transmission. If the current time has not arrived at the time of next transmission, then this periodic e-mail transmission process is terminated. If the current time has arrived at or exceeded the time of next transmission, then the periodic communication calculator 1301 reads the contents of an e-mail to be transmitted that meets the transmission time conditions of the periodic process recording information acquired in the step S1103 from the timing regulation information 1303 (step S1105) and sends the e-mail contents to the periodic communication generator 605 (step S1107). In the processing in the step S1105, the "set number of times of transmission" that meets the above-described transmission time conditions is simultaneously read from the timing regulation information 1303, the number of times of transmission of the periodic process recording information 1302 is updated, and in a step S1111, described later, the e-mail transmission date is made to be the last transmission time. Further, transmission timing that meets the transmission time conditions of the timing regulation information 1303 is read from the updated number of times of transmission and the time of next transmission of the periodic process recording information 1302 is updated to a value acquired by adding the transmission timing to the last transmission time.

For example, in the monitoring apparatus 1a employing the example of the periodic process recording information 1302 shown in FIG. 18, if it is assumed that the current time has arrived at the time of next transmission (here, May 10), then because the number of times of transmission of the periodic process recording information 1302 is 8, the transmission time conditions "number of times of transmission is less than 10 (but more than 5)" in the example of timing regulation information 1303 shown in FIG. 19 can apply. Accordingly, the next transmission time becomes May 12 (=2 days after May 10), the number of times of transmission is updated from 8 to 9 (=8+1), and the last transmission time becomes May 10. In this case, an e-mail with contents "2 days after" is sent to the periodic communication generator 605. Further, in the monitoring apparatus 1a employing the example of the periodic process recording information 1302 shown in FIG. 18, if it is assumed that the current time has exceeded the time of next transmission (May 10), then the conditions "time of next transmission exceeded" in the example of timing regulation information 1303 shown in FIG. 19 can apply. Accordingly, the next transmission time is May 11 (=1 day after May 10), the number of times of transmission is updated to 1, and the last transmission time becomes May 10. In this case, an e-mail with contents "1 day after" is sent to the periodic communication generator 605.

Returning to FIG. 21, when the e-mail contents is sent to the periodic communication generator 605 from the periodic communication calculator 1301 in the step S1107, the periodic communication generator 605 acquires e-mail generation information such as the sender ID, the sender's address and the subject information (the character string "Beacon", the same as in the first embodiment) from the e-mail generation information 606 (step S1108), generates an e-mail to be transmitted (S1109) and sends that e-mail to be transmitted to the e-mail processor 603. The e-mail processor 603, when it receives such e-mail to be transmitted, attaches to the e-mail a message ID, date and any other information as such e-mail transmission information as is necessary to e-mail exchange (step S1110), and transmits that e-mail to an e-mail server via the communication processor 602.

Figure 22:
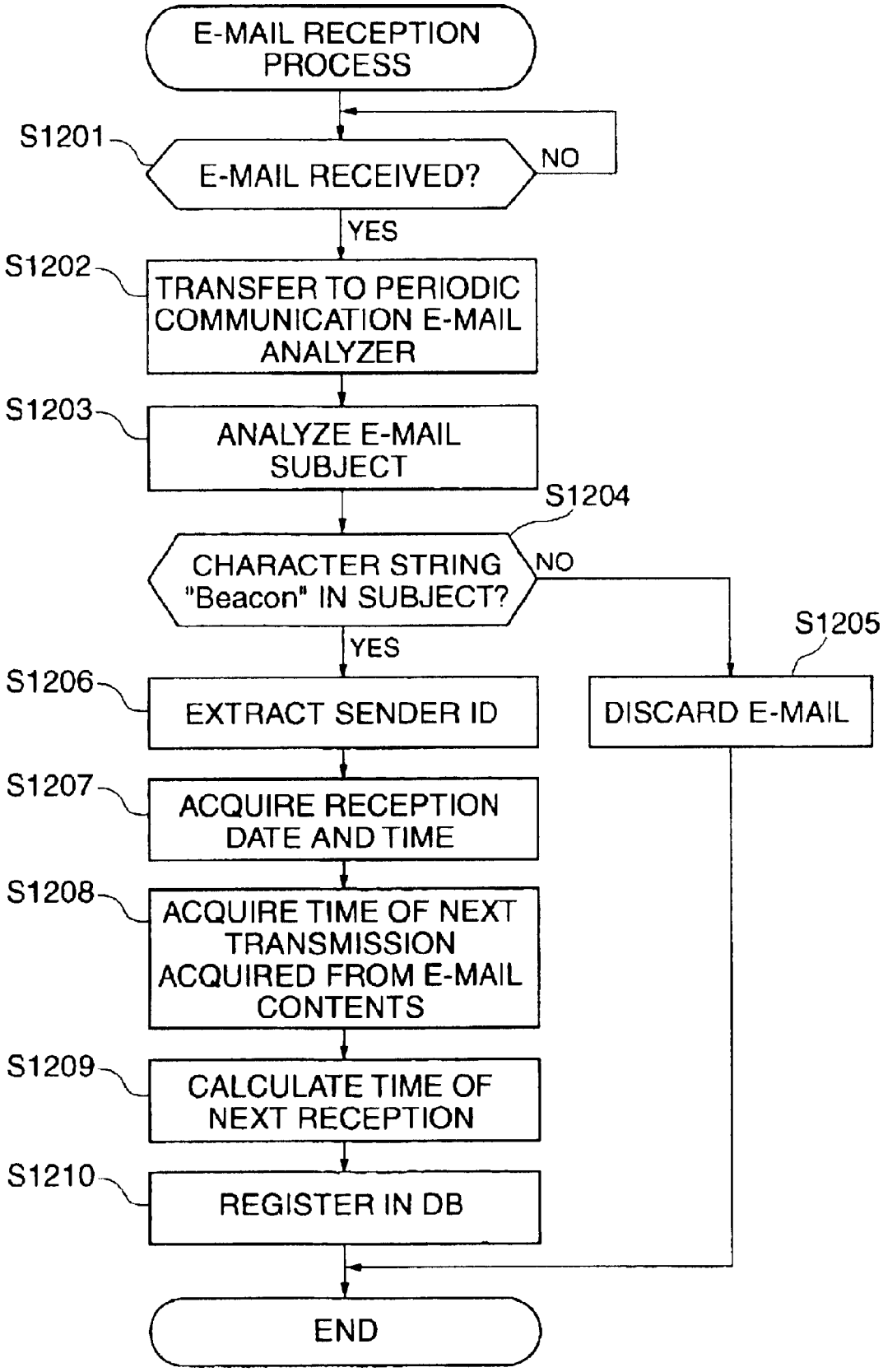
FIG. 22 is a flow chart showing the procedure of an e-mail reception process executed by the center side management server according to the second embodiment.

FIG. 22 is a flow chart showing the procedure of an e-mail reception process executed by the center side management server according to the second embodiment.

In FIG. 22, first, when the communication processor 608 of the center side management server 6 receives e-mails addressed to the center side management server 6 ("YES" to a step S1201), the communication processor 608 delivers the received e-mail via the e-mail processor 609 to the periodic communication e-mail analyzer 610 (step S1202).

The periodic communication e-mail analyzer 610 analyzes the subject of the received e-mail (step S1203), as a result of which it is determined whether or not a character string (here, "Beacon") indicating that the e-mail is a previously set periodically transmitted e-mail is in the subject (step S1204). If "Beacon" is in the subject, then the received e-mail is deemed to be a periodically transmitted e-mail (that is, a confirmatory e-mail) and the process then proceeds to a step S1206. If "Beacon" is not in the subject, then the received e-mail is deemed not to be a periodically transmitted e-mail (confirmatory e-mail) and is discarded (step S1205).

In the step S1206, the periodic communication e-mail analyzer 610 extracts the sender ID from the subject of the received e-mail (step S1206). The periodically transmitted e-mail (confirmatory e-mail) can be sent from any of the plurality of monitoring apparatuses, and therefore the monitoring apparatus from which the e-mail is sent can be identified from the sender ID. In the example shown in FIG. 12 described above, the subject is "Beacon from agent 001_211", with the "agent 001_211" character string after the word "from" being the sender ID.

Then, the periodic communication e-mail analyzer 610 acquires the date and time the e-mail was received from the timer processor 612 of the center side management server 6 (step S1207). The periodic communication e-mail analyzer 610 then acquires the time of next transmission from the e-mail contents (step S1208) and calculates the time of next transmission using the time of next transmission and the date and time acquired in the step S1207 (step S1209). Information of the correspondence between the calculated time of next transmission and the sender ID extracted in the step S1206 is registered in the database 611 as DB information (step S1210) and the process is then terminated. If DB information pertaining to the same sender ID is already registered in the database 611, then the time of next transmission of that DB information is updated.

Figure 23:
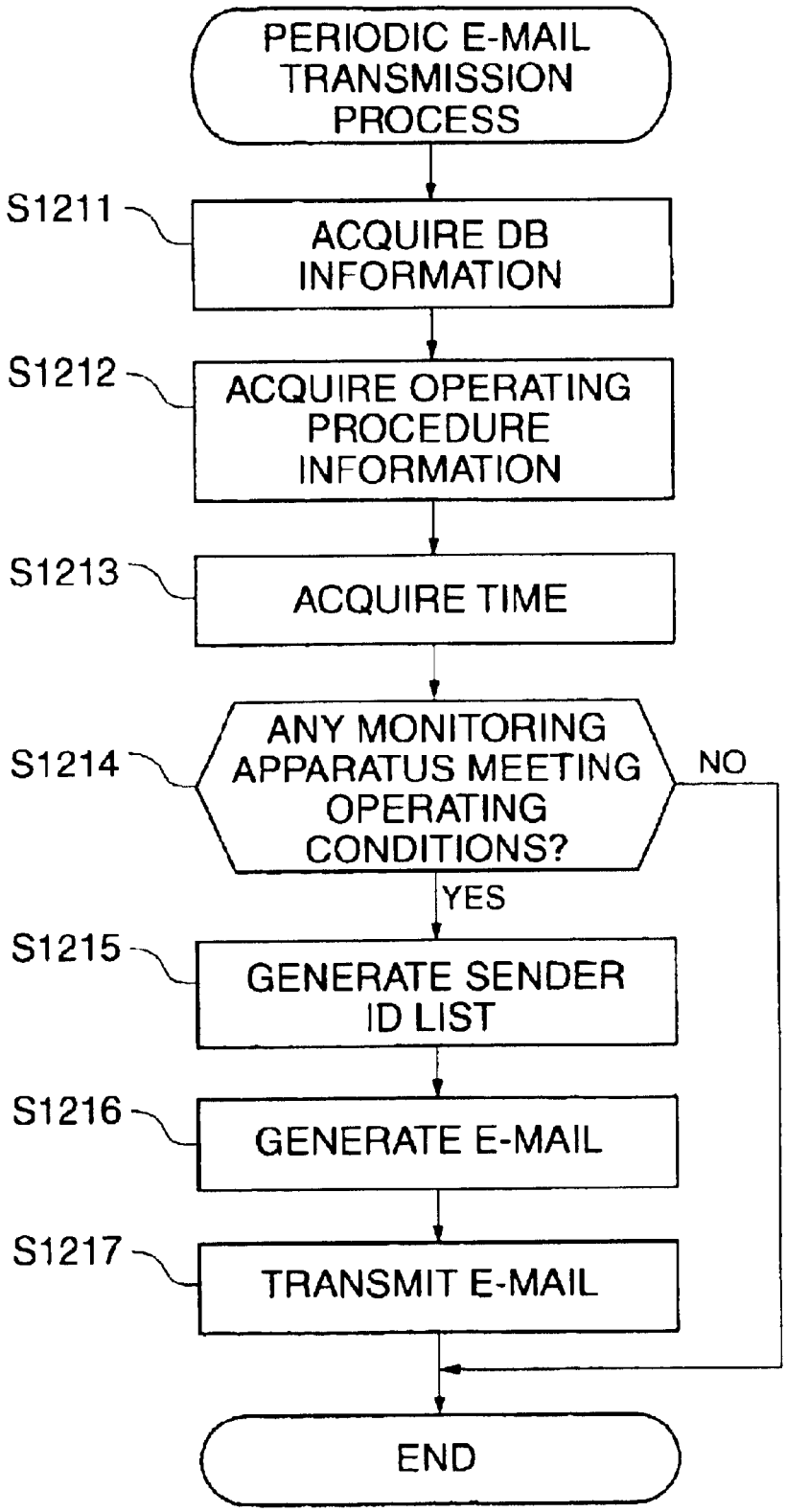
FIG. 23 is a flow chart showing the procedure of a periodic e-mail transmission process executed by the center side management server according to the second embodiment.

FIG. 23 is a flow chart showing the procedure of a periodic e-mail transmission process executed by the center side management server 6 according to the second embodiment.

In FIG. 23, first, the periodic communication manager 613 of the center side management server 6 acquires DB information stored in the database 611 in the step S1201 in FIG. 22 (step S1211) as well as operating procedure information from the processing setting information 614 (step S1212), in predetermined timing instructed by the timer processor 612.

For example, the operating procedure information extracted from the processing setting information 614 includes operating procedure information that instructs the apparatus to "search for monitoring apparatuses for which the current time has exceeded the time of next transmission, make a list of the sender IDs of such monitoring apparatuses, and transmit a notification e-mail with the list attached thereto". Then, the periodic communication manager 613 acquires the current time from the timer processor 612 of the center side management server 6 (step S1213) according to the operating procedure information acquired in the step S1212.

Next, the periodic communication manager 613 determines whether or not one or more of the monitoring apparatuses meet the conditions of the operating procedure, specifically, the predetermined conditions that the current time has exceeded the time of next transmission (step S1214). The periodic communication manager 613 selects the sender ID or Ids of one or more monitoring apparatuses to which the predetermined conditions that the current time has exceeded the time of next transmission ("YES" to the step S1214), and generates a list of the selected Id or Ids as monitoring object management information (step S1215). If there is no monitoring apparatus meeting the conditions that the current time has exceeded the time of next transmission ("NO" to the step S1214), the present process is terminated.

The notification e-mail generator 615 then generates an e-mail to which is attached as an attachment file the monitoring object management information generated by the periodic communication manager 613 in the step S1215, based on e-mail generation information 616 (step S1216).

The e-mail thus generated is sent to one or more monitoring apparatuses meeting the conditions of the operating procedure acquired in the step S1212 via the e-mail processor 609 (step S1217).

As described above, according to the second embodiment, each of a plurality of monitoring apparatuses including the monitoring apparatus 1a notifies the center side management server 6 of the timing of the next e-mail transmission, the center side management server 6 determines whether or not there are monitoring apparatuses that have not sent this e-mail in the timing of the next e-mail transmission by receiving the periodically transmitted e-mails and, if such monitoring apparatuses are present, transmits e-mails to these monitoring apparatuses notifying them of the abnormality. Since thus, it is possible to set the timing of the next e-mail transmission at the plurality of monitoring apparatuses including the monitoring apparatus 1a, if for example it is known in advance that the monitoring apparatus 1a is to stop operating for one week, then a false detection of an abnormality at this monitoring apparatus 1a can be prevented by the monitoring apparatus 1a notifying the center side management server 6 of the timing of the next e-mail transmission including that one week.

Moreover, in the second embodiment, e-mail contents relating to the time of next transmission may be included in the text of the e-mail and that e-mail is transmitted from the monitoring apparatus 1a to the center side management server 6, with the center side management server 6 then calculating the date and time of next reception based on the contents of the e-mail. Alternatively to such an arrangement, however, the date and time of next transmission may itself be included in the text of the e-mail, with the center side management server 6 using that date and time as the date and time of next reception.

Next, a description will be given of a management apparatus according to a third embodiment of the present invention.

In the first and second embodiments described above, when a monitoring apparatus is newly added to the remote monitoring system, information on the monitoring apparatus must be added to the center side management server database manually. Moreover, when detaching a monitoring apparatus from the remote monitoring system, information on the monitoring apparatus must be deleted from the center side management server database manually. In the third embodiment, these manual operations are eliminated.

The structure of the third embodiment is basically the same as the structure of the first embodiment, and therefore the following description of the second embodiment is limited to only those parts that differ from the first embodiment.

Figure 24:
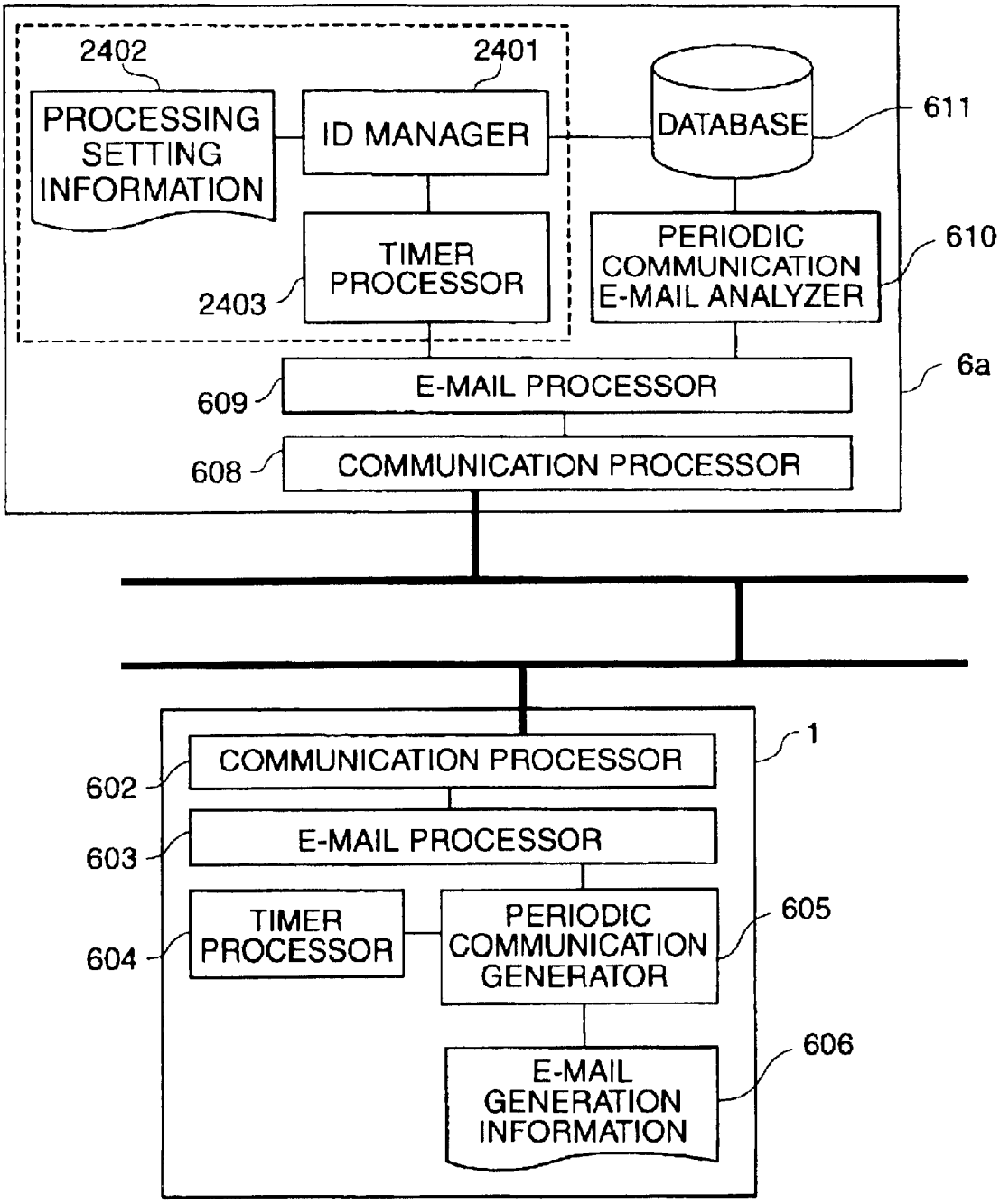
FIG. 24 is a block diagram showing the internal functional structure of a management apparatus and a management apparatus (center side management server) according to a third embodiment of the present invention.

FIG. 24 is a block diagram showing the internal functional structure of a management apparatus and a center side management server according to the third embodiment. The center side management server 6a corresponds to the center side management server 6 of the first embodiment. It should be noted that, in the third embodiment as well, the center side management server 6a may be replaced by the PC7 or by an apparatus that is a combination of the center side management server 6a and the PC 7. Further, the monitoring apparatus 1 may be replaced by the terminal side management server 2 or by an apparatus that is a combination of the monitoring apparatus 1 and the terminal side management server 2.

The third embodiment is different from the first embodiment in that, as indicated by the dotted line in FIG. 24, the center side management server 6a of the third embodiment is provided with an ID manager 2401, processing setting information 2402 and a timer processor 2403. Except for this, the third embodiment is identical to the first embodiment.

The ID manager 2401 inputs, updates and deletes sender ID information and the like in the database 611 based on received e-mails. The processing setting information 2402 consists of operating procedure conditions, and in the present embodiment, indicates the conditions under which DB information in the database 611 is deleted.

The timer processor 2403 performs task management of programs in the center side management server 6a.

It should be noted that the e-mail generation information 606 according to the third embodiment has the same information as the example of e-mail generation information according to the first embodiment shown in FIG. 10. Moreover, the contents of the e-mail transmitted from the monitoring apparatus 1 according to the third embodiment is also the same as the example of e-mail contents according to the first embodiment shown in FIG. 12.

FIG. 25 is a diagram showing an example of processing setting information according to the third embodiment. Of the information stored in the database 611, that which matches the conditions shown here is deleted from the database.

FIG. 26 is a diagram showing an example of information stored in the database 611 which is composed of sender ID, number of times of reception, first reception date and last reception date.

The processing operation of the monitoring apparatus 1 according to the third embodiment is the same as that of the monitoring apparatus 1 according to the first embodiment and description thereof is omitted.

Figure 27:
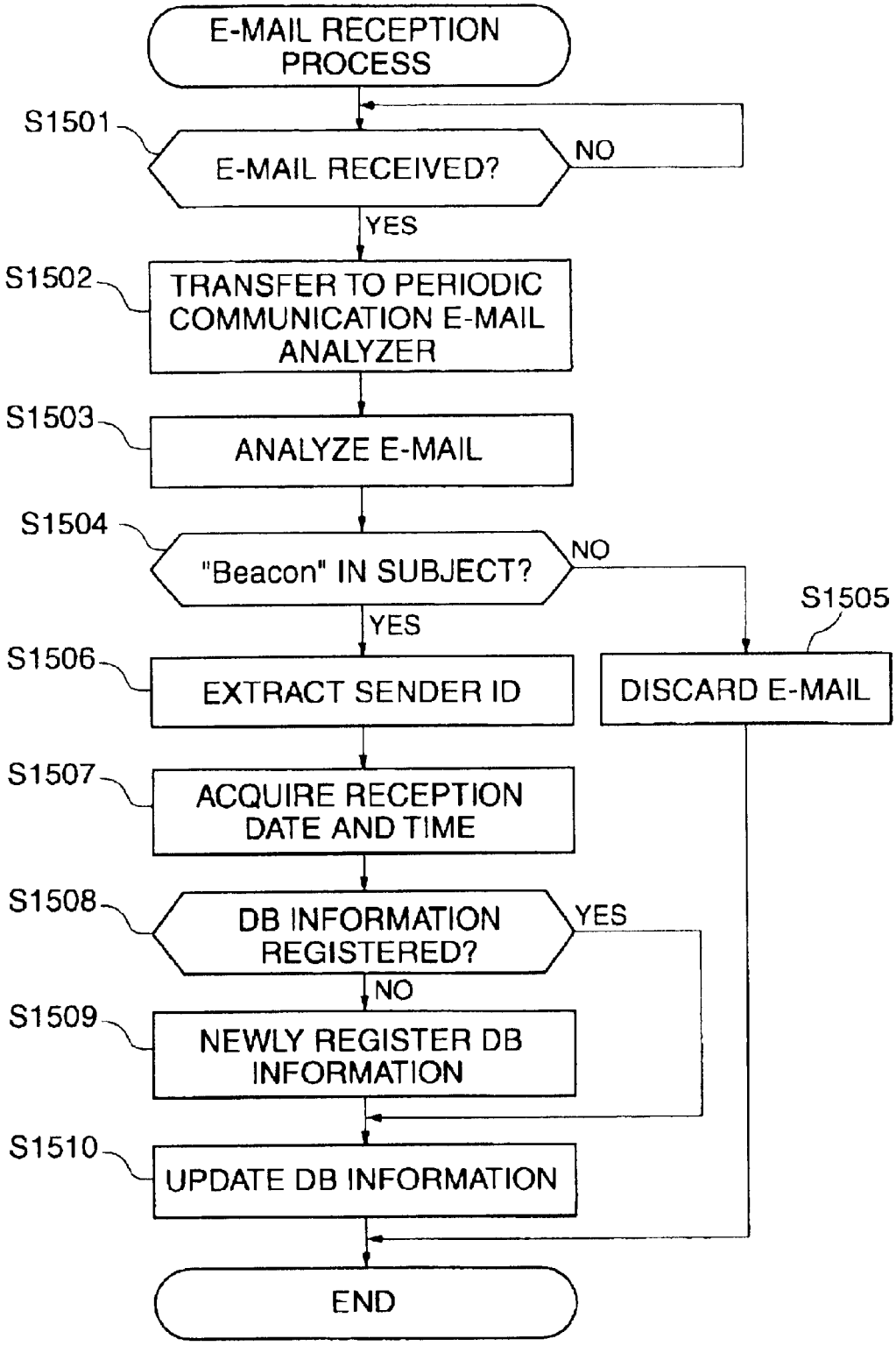
FIG. 27 is a flow chart showing the procedure of an e-mail reception process executed by the center side management server according to the third embodiment.

FIG. 27 is a flow chart showing the procedure of an e-mail reception process executed by the center side management server 6a according to the third embodiment.

In FIG. 27, first, when the communication processor 608 of the center side management server 6 receives e-mails addressed to the center side management server 6 ("YES" to a step S1501), the communication processor 608 delivers the received e-mail via the e-mail processor 609 to the periodic communication e-mail analyzer 610 (step S502).

The periodic communication e-mail analyzer 610 analyzes the subject of the received e-mail (step S1503), as a result of which it is determined whether or not a character string (here, "Beacon") indicating that the e-mail is a previously set periodically transmitted e-mail is in the subject (step S1504). If "Beacon" is in the subject, then the received e-mail is deemed to be a periodically transmitted e-mail (that is, a confirmatory e-mail) and the process then proceeds to a step S1506. If "Beacon" is not in the subject, then the received e-mail is deemed not to be a periodically transmitted e-mail (confirmatory e-mail) and the received e-mail is discarded (step S1505).

In the step S1506, the periodic communication e-mail analyzer 610 extracts the sender ID from the subject of the received e-mail (step S1506). The periodically transmitted e-mail (confirmatory e-mail) can be sent from any of the plurality of monitoring apparatuses, and therefore the monitoring apparatus from which the e-mail is sent can be identified from the sender ID. In the example shown in FIG. 12 described above, the subject is "Beacon from agent 001_211", with the "agent 001_211" character string after the word "from" being the sender ID.

Then, the periodic communication e-mail analyzer 610 acquires the date and time the e-mail was received from the timer processor 2403 of the center side management server 6a (step S1507). The periodic communication e-mail analyzer 610 then checks the database 611 and determines whether or not DB information including the sender ID extracted in the step S1506 is registered in the database 611 (step S1508). If such information is registered, the process then proceeds to a step S1510. If no such information is registered, the process then proceeds to a step S1509.

In the step S1509, DB information including the sender ID is newly registered in the database 611 and the date of reception in the step S1501 is set as the date of first reception (step S1509). In the step S1510, of the information registered in the database 611, the number of times of reception and last reception date corresponding to the sender ID extracted in the step S1506 are updated (step S1510).

Figure 28:
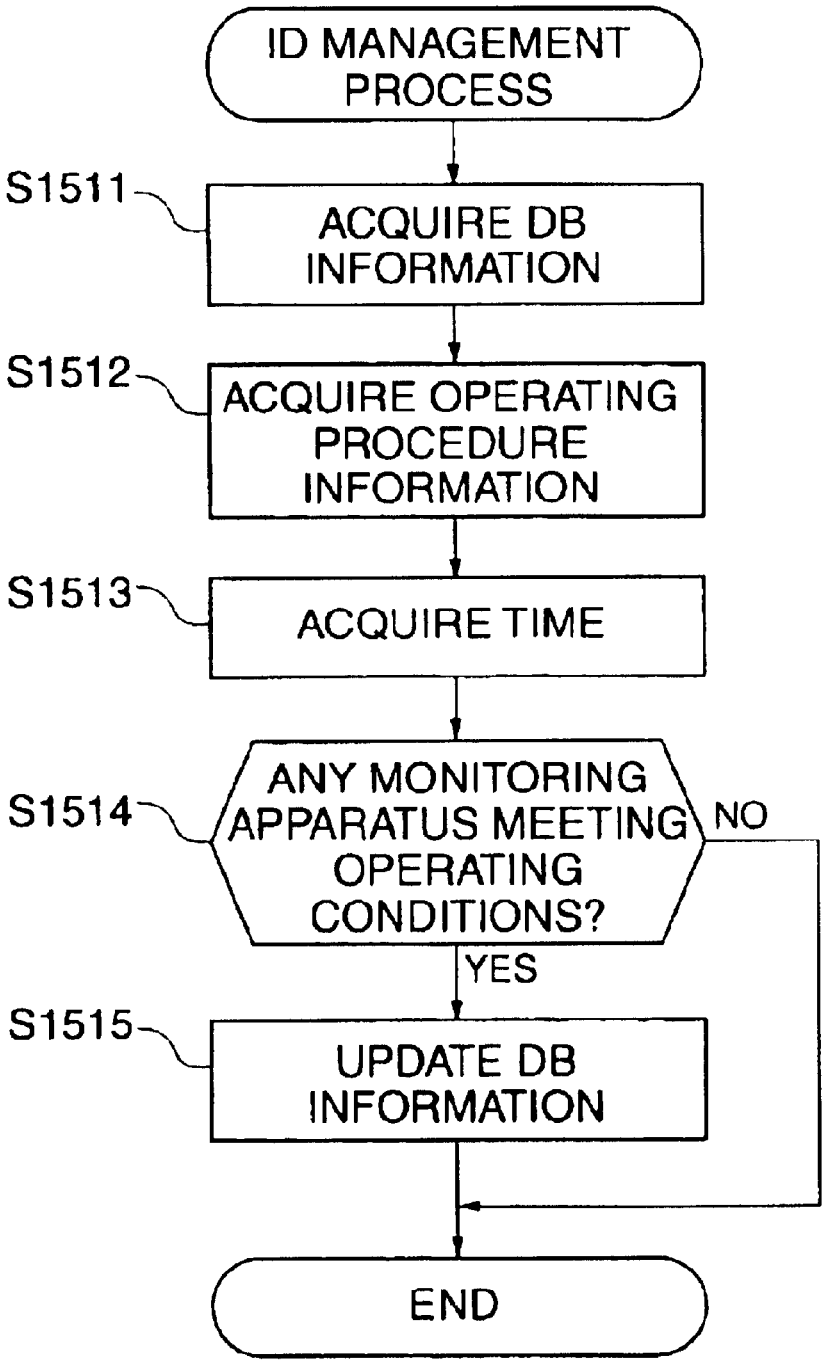
FIG. 28 is a flow chart showing the procedure of an ID management process executed by the center side management server according to the third embodiment.

FIG. 28 is a flow chart showing the procedure of an ID management process executed by the center side management server according to the third embodiment.

In FIG. 28, first, the ID manager 2401 periodically checks the database 611 according to a signal from the timer processor 2403 and acquires the DB information shown, for example, in FIG. 26 (step S1511). Moreover, the ID manager 2401 acquires deletion conditions (operating procedure conditions) shown for example in FIG. 25 from the processing setting information 2402 (step S1512). Further, the ID manager 2401 acquires the current date (current time) from the timer processor 2403 of the center side management server 6a (step S1513). In the following description, the current date is assumed to be May 14.

The ID manager 2401 determines whether or not there are any monitoring apparatuses that meet the operating procedure conditions acquired in the step S1512 (step S1514). Specifically, in the present process, the ID manager 2401 determines whether or not any of the DB information registered in the database 611 fits the deletion conditions shown in FIG. 25 that are the operating procedure conditions (step S1514).

First, of the DB information in the databases 6111 shown in FIG. 26, information with the sender ID is "agent001_211" is compared with the deletion conditions shown in FIG. 25, whereupon the number of times the above-described DB information has been received is 44. Therefore, this DB information does satisfy the deletion conditions shown in FIG. 25 specifying that "the number of times of reception is 20 or more and '(last reception date-first reception date)/number of times of reception+last reception date' is prior to the current date (in which case the information is to be deleted)".

Next, since the above-described DB information has a first reception date of Oct. 10, 2001 and a last reception date of May 12, 2002, the (last reception date−first reception date) is 203 days, the "(last reception date−first reception date)/number of times of reception" works out to 4.6 days and the "(last reception date−first reception date)/number of times of reception+last reception date" works out to May 16 (that is, May 12+4.6), which is after the current date of May 14. Therefore, regarding the deletion conditions specifying that "the number of times of reception is 20 or more and '(last reception date−first reception date)/number of times of reception+last reception date' is prior to the current date (in which case the information is to be deleted)", this DB information does not satisfy the condition that the "'(last reception date−first reception date)/number of times of reception+last reception date' is prior to the current date".

Therefore, the present DB information, that is, information for which the sender ID is "agent001_211", does not meet any of the deletion conditions shown in FIG. 25 and therefore is not targeted for deletion.

Next, of the DB information in the database 611 shown in FIG. 26, information with the sender ID is "agent122_045" is compared with the deletion conditions shown in FIG. 25, whereupon the number of times the above-described DB information has been received is 26. Here, according to the information in question, '(last reception date−first reception date)' is 132 days, and the number of times of reception is 26, and accordingly, '(last reception date−first reception date)/number of times of reception' works out to 5.1 days, and '(last reception date−first reception date)/number of times of reception+last reception date' works out to May 21, which is after the current date of May 14. Therefore, information with the sender ID "agent122_045", is targeted for deletion. The other information in the database shown in FIG. 26 is similarly processed. As a result, only that information with the sender ID "agent_FA_001" is targeted for deletion, and only this information is deleted from the database 611 as the DB information is updated (step S1515).

On the database 611 managed in the manner described above, the center side management server 6a according to the third embodiment executes the same periodically transmitted e-mail processing as in the first embodiment shown in FIG. 16, determines whether or not there are any monitoring apparatuses that have not sent e-mail for a predetermined period of time, and, when there are such monitoring apparatuses, transmits e-mail to those monitoring apparatuses informing them of the abnormality.

According to the third embodiment as described above, information is periodically transmitted from a plurality of monitoring apparatuses to the center side management server 6a, where the information received is stored in the database. Information pertaining to new monitoring apparatuses is automatically stored in the database. Moreover, at the center side management server, whenever there is DB information meeting the predetermined deletion conditions, that DB information is automatically deleted from the database and the database 611 is updated. By so doing, registration of the monitoring apparatus in the database on the center side management server by the center side management server manager becomes unnecessary. Moreover, when removing a monitoring apparatus, it is not necessary for information on that monitoring apparatus to be deleted from the database by the center side management server manager. Moreover, with the center side management server that sends notification of monitoring apparatus abnormalities to a predetermined address, there is no need to send unnecessary notifications of abnormalities to those monitoring apparatuses satisfying the above-described deletion conditions.

It should be noted that, in the third embodiment described above, a character string such as "Beacon" included in the subject is used as a method of determining whether or not a received e-mail is a periodically transmitted e-mail (confirmatory e-mail). Alternatively to such an arrangement, however, a particular character string or code may be imbedded in the text of the e-mail in order to indicate that the e-mail is a periodically transmitted e-mail, or information on a sender supposed to transmit periodically transmitted e-mail (confirmatory e-mail) may be pre-registered and the determination made according to whether or not such registered information is included in the periodically transmitted e-mail.

Moreover, although in the third embodiment described above the date on which periodically transmitted e-mail arrives at the center side management server is taken as the reception date and used as the deletion condition, instead the date of transmission recorded in the periodically transmitted e-mail may be used as the deletion condition and the same effect can still be obtained.

Further, although in the third embodiment described above the method of identifying the sender involves extracting the sender ID from the subject, alternatively a correspondence table correlating pre-registered sender addresses and sender IDs may be used, with the sender ID being acquired from the sender address or recorded in the text of the e-mail and that recording used instead.

It goes without saying that the object of the present invention may also be accomplished by supplying a system or an apparatus with a storage medium (or a recording medium) in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be supplied by downloading from another computer, a database, or the like, not shown, connected to the Internet, a commercial network, a local area network, or the like. Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of any of the above-mentioned embodiments on a computer, and the form of the program may be an object code, a program executed by an interpreter, or script data supplied to an OS.

What is claimed is:

1. A monitoring apparatus capable of communicating with a management apparatus that centrally manages a plurality of monitoring apparatuses[, the monitoring apparatus managing maintenance information relating to a plurality of peripheral apparatuses, including at least operation information], comprising:

a management device that manages [the] maintenance information relating to [the] *a plurality of* peripheral apparatuses *including at least operation information*; and a communication control device that periodically transmits*, to the management apparatus,* confirmation information including identification information identifying the monitoring apparatus, and the maintenance information[managed by the management apparatus;], wherein the management apparatus generates monitoring object management information based on a history of transmissions of the confirmation information carried out by said communication control device.

2. A monitoring apparatus as claimed in claim 1, further comprising a generation device that generates the confirmation information such that an identifier capable of identifying the confirmation information is contained in the confirmation information, [and]

wherein said communication control device periodically transmits the confirmation information with the identifier contained therein to the management apparatus.

3. A monitoring apparatus as claimed in claim 2, wherein said generation device generates an e-mail that contains the identification information identifying the monitoring apparatus therein and the identifier in a subject thereof.

4. A management apparatus capable of communicating with a plurality of monitoring apparatuses that manage maintenance information relating to a plurality of peripheral apparatuses, including at least operation information, for centrally managing the plurality of monitoring apparatuses, comprising:

a generation device that generates monitoring object management information based on a history of transmissions of confirmation information including identification information identifying each of the monitoring apparatuses, and the maintenance information managed thereby, the transmissions being periodically carried out by each of the monitoring apparatuses *from the monitoring apparatus to the management apparatus*.

5. A management apparatus as claimed in claim 4, wherein the monitoring object management information comprises information indicative of a list capable of identifying at least one monitoring apparatus for which the history of transmissions meets predetermined conditions.

6. A management apparatus as claimed in claim 4, further comprising a determination device that determines whether information capable of identifying at least one monitoring apparatus is to be included in the monitoring object management information, [and]

wherein said generation device adds the information capable of identifying the at least one monitoring apparatus to the information indicative of the list when said determination device determines that the information capable of identifying the at least one monitoring apparatus is to be included in the monitoring object management information.

7. A management apparatus as claimed in claim 4, further comprising a communication control device that transmits the monitoring object management information to the plurality of monitoring apparatuses.

8. A management apparatus as claimed in claim 4, further comprising a recording device that records a time of next transmission of the confirmation information[that is periodically transmitted by each of the plurality of monitoring apparatuses,]; and an abnormality determination device that, if the confirmation information has not arrived at the time of next transmission from any of the plurality of monitoring apparatuses, determines that an abnormality exists in the monitoring apparatus.

9. A management apparatus as claimed in claim 4, further comprising a registration device that registers the identification information identifying each of the monitoring apparatuses, [and]

wherein said registration device registers identification information included in the confirmation information transmitted from any of the monitoring apparatuses, if the registration information has not yet been registered.

10. A management apparatus as claimed in claim 4, further comprising a registration device that registers the identification information identifying each of the monitoring apparatuses, [and]

wherein said registration device deletes from the registered identification information identification information identifying any of the monitoring apparatuses for which the history of transmissions meets predetermined conditions.

11. A [management] *monitoring* method executed by a monitoring apparatus capable of communicating with a management apparatus that centrally manages a plurality of monitoring apparatuses[, the monitoring apparatus managing maintenance information relating to a plurality of peripheral apparatuses, including at least operation information], comprising:

a management step of managing [the] maintenance information relating to [the] *a plurality of* peripheral apparatuses *including at least operation information*; and a communication control step of periodically transmitting, *to the management apparatus,* confirmation information including identification information identifying the monitoring apparatus, and the maintenance information[managed by the management apparatus;], wherein the management apparatus generates monitoring object management information based on a history of transmissions of the confirmation information carried out in said communication control step.

12. A [management] *monitoring* method as claimed in claim 11, further comprising a generation step of creating the confirmation information such that an identifier capable of identifying the confirmation information is contained in the confirmation information, [and]

wherein said communication control step comprises periodically transmitting the confirmation information with the identifier contained therein to the management apparatus.

13. A [management] *monitoring* method as claimed in claim 12, wherein said generation step comprises creating an e-mail that contains the identification information identifying the monitoring apparatus therein and the identifier in a subject thereof.

14. A management method executed by a management apparatus capable of communicating with a plurality of monitoring apparatuses that manage maintenance information relating to a plurality of peripheral apparatuses, including at least operation information, for centrally managing the plurality of monitoring apparatuses, comprising:

a generation step of creating monitoring object management information based on a history of transmissions of confirmation information including identification information identifying each of the monitoring apparatuses, and the maintenance information managed thereby, the transmissions being periodically carried out by each of the monitoring apparatuses *from the monitoring apparatus to the management apparatus*.

15. A management method as claimed in claim 14, wherein the monitoring object management information comprises information indicative of a list capable of identifying at least one monitoring apparatus for which the history of transmissions meets predetermined conditions.

16. A management method as claimed in claim 14, further comprising a determination step of determining whether information capable of identifying at least one monitoring apparatus is to be included in the monitoring object management information, [and]

wherein said generation step comprises adding the information capable of identifying the at least one monitoring apparatus to the information indicative of the list when it is determined in said determination step that the information capable of identifying the at least one monitoring apparatus is to be included in the monitoring object management information.

17. A management method as claimed in claim 14, further comprising a communication control step of transmitting the monitoring object management information to the plurality of monitoring apparatuses.

18. A management method as claimed in claim 14, further comprising a recording step of recording a time of next transmission of the confirmation information[that is periodically transmitted by each of the plurality of monitoring apparatuses,]; and an abnormality determination step of determining, if the confirmation information has not arrived at the time of next transmission from any of the plurality of monitoring apparatuses, that an abnormality exists in the monitoring apparatus.

19. A management method as claimed in claim 14, further comprising a registration step of registering the identification information identifying each of the monitoring apparatuses, [and]

wherein said registration step comprises registering identification information included in the confirmation information transmitted from any of the monitoring apparatuses, if it has not yet been registered.

20. A management method as claimed in claim 14, further comprising a registration step of registering the identification information identifying each of the monitoring apparatuses, [and]

wherein said registration step comprises deleting from the registered identification information identification information identifying any of the monitoring apparatuses for which the history of transmissions meets predetermined conditions.

21. A *non-transitory computer-readable storage medium storing a* computer-executable management program *implementing a method* for a monitoring apparatus capable of communicating with a management apparatus that centrally manages a plurality of monitoring apparatuses[, the monitoring apparatus managing maintenance information relating to a plurality of peripheral apparatuses, including at least operation information], *the method* comprising:

a management [module for] *step* of managing the maintenance information relating to [the] *a plurality of* peripheral apparatuses *including at least operation information*; and a communication control [module for] *step* of periodically transmitting, *to the management apparatus,* confirmation information including identification information identifying the monitoring apparatus, and the maintenance information[managed by the management apparatus;], wherein the management apparatus generates monitoring object management information based on a history of transmissions of the confirmation information carried out [by] *in* said communication control [module] *step*.

22. A *non-transitory computer-readable storage medium storing a* computer-executable management program *implementing a method* for a management apparatus capable of communicating with a plurality of monitoring apparatuses that manage maintenance information relating to a plurality of peripheral apparatuses, including at least operation information, for centrally managing the plurality of monitoring apparatuses, *the method* comprising:

a generation [module for] *step of* creating monitoring object management information based on a history of transmissions of confirmation information including identification information identifying each of the monitoring apparatuses, and the maintenance information managed thereby, the transmissions being periodically carried out by each of the monitoring apparatuses *from the monitoring apparatus to the management apparatus*.

*23. A monitoring apparatus having a communication unit that communicates with a management apparatus that centrally manages a plurality of monitoring apparatuses, comprising:*

*a management device that acquires and manages maintenance information relating to a plurality of peripheral apparatuses including at least operation information, from the peripheral apparatuses; and*

*a communication control device that causes the communication unit to periodically transmit confirmation information including identification information identifying the monitoring apparatus, to the management apparatus,*

*wherein said communication control device further transmits the maintenance information to the management apparatus, and the management apparatus generates management information based on a history of notifications of the confirmation information carried out by said communication control device.*

*24. A monitoring apparatus as claimed in claim 23, further comprising*

*a generation device that generates the confirmation information such that an identifier capable of identifying the confirmation information is contained in the confirmation information, and*

*wherein said generation device generates an e-mail that contains the identification information identifying the monitoring apparatus therein and the identifier in a subject thereof.*

*25. A monitoring apparatus as claimed in claim 23, further comprising a setting changing device that changes timing of notifications carried out by said communication control device based on a predetermined condition.*

*26. A monitoring method executed by a monitoring apparatus having a communication unit that communicates with a management apparatus that centrally manages a plurality of monitoring apparatuses, comprising:*

*a management step of acquiring and managing the maintenance information relating to a plurality of peripheral apparatuses including at least operation information, from the peripheral apparatuses;*

*a first communication control step of causing the communication unit to transmit the maintenance information to the management apparatus; and*

*a second communication control step of causing the communication unit to periodically transmit confirmation information including identification information identifying the monitoring apparatus to the management apparatus,*

*wherein the management apparatus generates management information based on a history of notifications of the confirmation information.*

*27. A monitoring method as claimed in claim 26, further comprising*

*a generation step of generating the confirmation information such that an identifier capable of identifying the*

*confirmation information is contained in the confirmation information,*

*wherein said generation step comprises generating an e-mail that contains the identification information identifying the monitoring apparatus therein and the identifier in a subject thereof.*

*28. A monitoring method as claimed in claim 26, further comprising a setting changing step of changing timing of notifications carried out in said second communication control step based on a predetermined condition.*

*29. A non-transitory computer-readable storage medium storing a program for causing a computer to implement a monitoring method executed by a monitoring apparatus having a communication unit that communicates with a management apparatus that centrally manages a plurality of monitoring apparatuses, the method comprising:*

*a management step of acquiring and managing maintenance information relating to a plurality of peripheral apparatuses including at least operation information, from the peripheral apparatuses;*

*a first communication control step of causing the communication unit to transmit the maintenance information to the management apparatus; and*

*a second communication control step of causing the communication unit to periodically transmit confirmation information including identification information identifying the monitoring apparatus to the management apparatus,*

*wherein the management apparatus generates management information based on a history of notifications of the confirmation information.*

*30. A non-transitory computer-readable storage medium as claimed in claim 29, the method further comprising*

*a generation step of generating the confirmation information such that an identifier capable of identifying the confirmation information is contained in the confirmation information,*

*wherein said generation step includes generating an e-mail that contains the identification information identifying the monitoring apparatus therein and the identifier in a subject thereof.*

*31. A non-transitory computer-readable storage medium as claimed in claim 29, the method further comprising a setting changing step of changing timing of notifications carried out in said second communication control step based on a predetermined condition.*

* * * * *